(12) United States Patent
Bowdery et al.

(10) Patent No.: US 9,763,114 B2
(45) Date of Patent: Sep. 12, 2017

(54) CELL PERFORMANCE ASSESSMENT

(71) Applicant: AIRCOM INTERNATIONAL LTD, Leatherhead (GB)

(72) Inventors: Colin Gordon Bowdery, Plano, TX (US); Gerard Terence Foster, Marston Meysey (GB)

(73) Assignee: Aircom International LTD., Surrey (GB)

( * ) Notice: Subject to any disclaimer, the term of this patent is extended or adjusted under 35 U.S.C. 154(b) by 482 days.

(21) Appl. No.: 14/367,898

(22) PCT Filed: Dec. 21, 2012

(86) PCT No.: PCT/GB2012/053244
§ 371 (c)(1),
(2) Date: Jun. 21, 2014

(87) PCT Pub. No.: WO2013/098558
PCT Pub. Date: Jul. 4, 2013

(65) Prior Publication Data
US 2015/0085681 A1    Mar. 26, 2015

Related U.S. Application Data

(60) Provisional application No. 61/581,941, filed on Dec. 30, 2011.

(51) Int. Cl.
*H04J 1/16*    (2006.01)
*H04W 24/02*   (2009.01)

(52) U.S. Cl.
CPC ................... *H04W 24/02* (2013.01)

(58) Field of Classification Search
CPC .................................................. H04W 24/02
(Continued)

(56) References Cited

U.S. PATENT DOCUMENTS 9,313,684 B2 *    4/2016    Barberis ............... H04W 24/02
2001/0021984 A1 * 9/2001    Kim ........................ H04L 1/188
                                                              714/18
(Continued)

FOREIGN PATENT DOCUMENTS

WO    WO 2010/145565 A1    12/2010

OTHER PUBLICATIONS

International Search Report in PCT/GB2012/053244 mailed Mar. 18, 2013.

(Continued)

*Primary Examiner* — Peter Cheng
(74) *Attorney, Agent, or Firm* — ATFirm PLLC; Ralph P. Albrecht

(57) ABSTRACT

A method for assessing performance of a cell in a network in which data is passed between layers in a protocol stack implemented by the cell. The method comprises calculating a data efficiency of data passing through a physical layer in the protocol stack via one or more higher layers in the protocol stack based on a comparison of a number of physical resource data units allocated to that data at the physical layer with a data throughput of one or more of the layers of the protocol stack. The method further comprises calculating an average efficiency by averaging the data efficiency over a predetermined time and normalizing the average efficiency with respect to a predetermined efficiency so as to generate a normalized average efficiency. The method also comprises comparing the normalized average efficiency with a target threshold and adjusting the operation of the cell if the normalized average efficiency differs from the target threshold by greater than a threshold amount.

27 Claims, 11 Drawing Sheets

(58) Field of Classification Search
USPC .......................................................... 370/252
See application file for complete search history.

(56) References Cited

U.S. PATENT DOCUMENTS

| | | | |
|---|---|---|---|
| 2002/0009125 A1* | 1/2002 | Shi | H04B 1/69 375/139 |
| 2003/0053482 A1* | 3/2003 | Li | H04L 1/0002 370/465 |
| 2003/0123574 A1* | 7/2003 | Simeon | H04L 27/30 375/340 |
| 2008/0159203 A1* | 7/2008 | Choi | H04B 7/0689 370/328 |
| 2011/0105139 A1 | 5/2011 | On | |
| 2011/0183686 A1* | 7/2011 | Quinn | H04W 16/06 455/456.1 |
| 2012/0088491 A1 | 4/2012 | Deng et al. | |
| 2012/0282970 A1* | 11/2012 | Kela | H04W 52/146 455/522 |
| 2014/0094186 A1* | 4/2014 | Barberis | H04W 24/02 455/453 |

OTHER PUBLICATIONS

NTT Docomo et al., "Physical resource block usage measurements at eNB", Feb. 11-15, 2008 3GPP Draft; R2-081164 PRB Usage Measurements, 3rd Generation Partnership Project (3GPP), Mobile Competence Centre; 650 Route Des Lucioles; F-06921 Sophia-Antipolic Cedex; France, vol. RAN WG2, No. Sorrento, Italy; Feb. 5, 2008, Feb. 5, 2008, XP050138940, Section 2. Discussion.

Sujuan Feng et al.; "Self-Organizing Networks (SON) in 3GPP Long Term Evolution," Internet Citation, May 20, 2008, pp. 1-15, XP007907980, Retrieved from Internet: URL: http://www.nomor.de/uploads/gc/TQ/gcTQfDWApo9osPfQwQoBzw/SelfOrganisingNetworksInLTE__2008-05.pdf (retrieved Mar. 27, 2009), p. 3, left-hand column, lines 1-14 section 2, Coverage and Capacity Optimization; figure 8.

* cited by examiner

CELL PERFORMANCE ASSESSMENT

The present disclosure relates to cell performance assessment.

Data capacity of mobile telecommunications networks has been increasing over the years. This is due, at least in part, to the introduction of new mobile telecommunications standards and improvements in mobile telecommunications technology. One such standard is the so-called Third Generation Partnership Project Long Term Evolution (3GPP LTE) standard.

Additionally, it is becoming more common for base stations in a mobile network to be more autonomous with responsibility for managing communications being decentralised away from core networks. So-called "self organising networks" (SONs) are beginning to be introduced, which can help provide autonomous network operation such as resource deployment and configuration.

However, as there are many different types of base station and many different providers, it may be difficult for a cellular operator to determine whether a base station and its associated cell are performing within desired parameters. One way to address this is for the base station to report so-called "Key Performance Indicators (KPIs)" to a cellular operator which may be used to determine the performance of a cell. For example, the Key Performance Indicators could include a quality of service indicator, number of bits per second, and the like. By analysing the Key Performance Indicators, a cellular operator may be able to determine areas of high interference (e.g. in which signal quality is degraded to below a threshold quality level), sleeping cells, hot spots, and/or poor design, which may lead to low resource efficiency (e.g. a number of bits per second is below a threshold number of bits per second).

In order to determine which factors influence the performance of the cell, for example to detect areas of high interference, sleeping cells, hot spots, poor design and the like, an engineer may typically analyse each KPI to try to determine which KPI is having the most effect on performance. Alternatively, this may be carried out by a self-organising network, but this may lead to an increase in processing overhead and/or relatively poor optimisation due to the number of KPIs involved. Typically, it may only be possible to optimise performance with respect to one KPI, to the detriment of others, thus meaning that overall performance of a cell may suffer.

Once this is determined, a cellular operator may wish to perform cell optimisation, for example by reconfiguring settings of a base station, physical re-arrangement of equipment at the base station, capacity augmentation so as to increase the capacity of a cell, and the like. However, the analysis of the KPIs can be time consuming for the engineer and costly for the cellular operator due to the complexity of analysing the KPIs. Furthermore, in the case of a self-organising network, it may be difficult for a cellular operator to control the network so that performance of one or more cells meets with operating requirements, due to decentralisation of control and automation of cell configuration and deployment.

In a first aspect, there is provided a method for assessing performance of a cell in a network in which data is passed between layers in a protocol stack implemented by the cell, the method comprising: calculating a data efficiency of data passing through a physical layer in the protocol stack via one or more higher layers in the protocol stack based on a comparison of a number of physical resource data units allocated to that data at the physical layer with a data throughput of one or more of the layers of the protocol stack; calculating an average efficiency by averaging the data efficiency over a predetermined time; normalising the average efficiency with respect to a predetermined efficiency so as to generate a normalised average efficiency; comparing the normalised average efficiency with a target threshold; and adjusting the operation of the cell if the normalised average efficiency differs from the target threshold by greater than a threshold amount.

In a second aspect, there is provided apparatus for assessing performance of a cell in a network in which data is passed between layers in a protocol stack implemented by the cell, the apparatus comprising: means for calculating a data efficiency of data passing through a physical layer in the protocol stack via one or more higher layers in the protocol stack based on a comparison of a physical resource data unit allocated to that data at the physical layer with a data throughput of one or more of the layers of the protocol stack; means for calculating an average efficiency by averaging the data efficiency over a predetermined time; means for normalising the average efficiency with respect to a predetermined efficiency so as to generate a normalised average efficiency; means for comparing the normalised average efficiency with a target threshold; and means for adjusting the operation of the cell if the normalised average efficiency differs from the target threshold by greater than a threshold amount.

In a third aspect, there is provided apparatus for assessing performance of a cell in a network in which data is passed between layers in a protocol stack implemented by the cell, the apparatus comprising logic operable to carry out the steps of: calculating a data efficiency of data passing through a physical layer in the protocol stack via one or more higher layers in the protocol stack based on a comparison of a physical resource data unit allocated to that data at the physical layer with a data throughput of one or more of the layers of the protocol stack; calculating an average efficiency by averaging the data efficiency over a predetermined time; normalising the average efficiency with respect to a predetermined efficiency so as to generate a normalised average efficiency; comparing the normalised average efficiency with a target threshold; and adjusting the operation of the cell if the normalised average efficiency differs from the target threshold by greater than a threshold amount.

In a fourth aspect, there is provided apparatus for assessing performance of a cell in a network in which data is passed between layers in a protocol stack implemented by the cell, the apparatus comprising: a data efficiency calculator operable to calculate a data efficiency of data passing through a physical layer in the protocol stack via one or more higher layers in the protocol stack based on a comparison of a physical resource data unit allocated to that data at the physical layer with a data throughput of one or more of the layers of the protocol stack; an average efficiency calculator operable to calculate an average efficiency by averaging the data efficiency over a predetermined time; an average efficiency normaliser operable to normalise the average efficiency with respect to a predetermined efficiency so as to generate a normalised average efficiency; a comparator operable to compare the normalised average efficiency with a target threshold; and a cell adjustment module operable to adjust the operation of the cell if the normalised average efficiency differs from the target threshold by greater than a threshold amount.

In a fifth aspect, there is provided a method for assessing performance of a cell in a 3GPP long term evolution (LTE) network in which data is passed between layers in a 3GPP LTE protocol stack implemented by the cell, the method comprising: calculating a data efficiency of data passing through a physical layer in the protocol stack via one or more higher layers in the protocol stack based on a comparison of a physical resource block allocated to that data at the physical layer with a data throughput of one or more of the layers of the protocol stack; calculating an average efficiency by averaging the data efficiency over a predetermined time; normalising the average efficiency with respect to a predetermined efficiency so as to generate a normalised average efficiency; comparing the normalised average efficiency with a target threshold; and adjusting the operation of the cell if the normalised average efficiency differs from the target threshold by greater than a threshold amount.

In a sixth aspect, there is provided a method for assessing performance of a cell in a network in which data is passed between layers in a protocol stack implemented by the cell, the method comprising: calculating a data efficiency of data passing through a physical layer in the protocol stack via one or more higher layers in the protocol stack based on a comparison of a physical resource data unit allocated to that data at the physical layer with a data throughput of one or more of the layers of the protocol stack; calculating an average efficiency by averaging the data efficiency over a predetermined time; normalising the average efficiency with respect to a predetermined efficiency so as to generate a normalised average efficiency; comparing the normalised average efficiency with a target threshold; detecting if a degree of utilisation of the cell is greater than a cell utilisation threshold if the normalised efficiency is greater than the target threshold by the efficiency threshold amount; triggering a procedure to augment the capacity of the cell if the degree of utilisation of the cell is greater than the cell utilisation threshold and the normalised average efficiency is greater than the target threshold by the efficiency threshold amount; and triggering a cell optimisation procedure if the normalised average efficiency is less than the target threshold by the efficiency threshold amount.

In a seventh aspect, there is provided a method for assessing performance of a cell in a network in which data is passed between layers in a protocol stack implemented by the cell, the method comprising: detecting a number of physical resource data units allocated to data passing through a physical layer in the protocol stack via one or more higher layers in the protocol stack; detecting a data throughput of the one or more of the layers of the protocol stack; calculating an average efficiency from the detected number of physical resource data units and the detected data throughput; normalising the average efficiency with respect to a predetermined efficiency so as to generate a normalised average efficiency; comparing the normalised average efficiency with a target threshold; and adjusting the operation of the cell if the normalised average efficiency differs from the target threshold by greater than a threshold amount.

Accordingly, example implementations may provide a way for a cellular operator (for example) to determine whether operation of the cell should be adjusted, for example, in response to poor performance, or a cell's utilisation being at or near capacity. Additionally, example implementations may help provide an indication of whether a self organising network algorithm is performing to a cellular operator's satisfaction.

Detailed examples will now be described by way of example with reference to the accompanying drawings, in which.

Techniques for cell performance assessment are disclosed. In the following description, a number of specific details are presented in order to provide a thorough understanding. It will be apparent however to a person skilled in the art that these specific details need not be employed to practise the present disclosure. Conversely, specific details known to the person skilled in the art are omitted for the purposes of clarity in presenting the disclosure.

Figure 1:
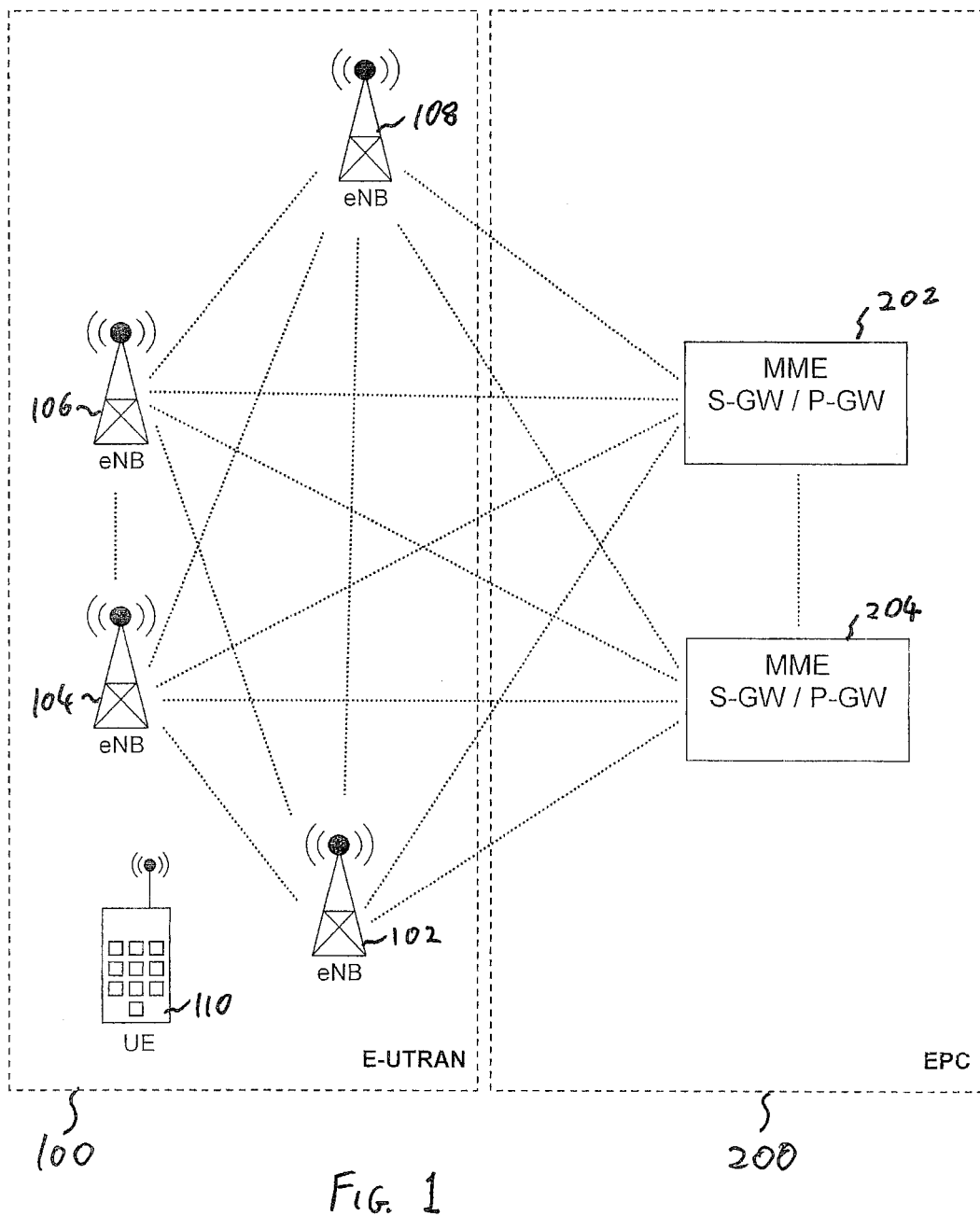
FIG. 1 is a schematic diagram of a telecommunications network architecture.

FIG. 1 schematically shows a representation of a telecommunications network architecture according to examples of the present disclosure. In particular, FIG. 1 shows a schematic representation of an example of a 3GPP LTE (Third Generation Partnership Project Long Term Evolution) network architecture. The 3GPP LTE network architecture is based on using internet packets (IP) for communication.

In the example shown in FIG. 1, an Enhanced Universal Terrestrial Radio Access Network (E-UTRAN) 100 is illustrated together with an Evolved Packet Core (EPC) 200. In examples, the E-UTRAN typically comprises a plurality of Enhanced Node Bs (eNBs). An eNB may also be referred to as a base station. In the example of FIG. 1, the E-UTRAN 100 comprises a first eNB 102, a second eNB 104, a third eNB 106, and a fourth eNB 108, although it will be appreciated that the E-UTRAN 100 could comprise any suitable number of eNBs. In examples, the eNBs handle radio-interface related functions.

In the example of FIG. 1, the E-UTRAN 100 also comprises a User Equipment (UE) device 110, such as a mobile telephone, although it will be appreciated that any suitable UE device 110 could be any suitable device. The UE device 110 is operable to communicate wirelessly with one or more of the eNBs 102, 104, 106, and 108 accordingly to the 3GPP LTE standard. Although only one UE device is illustrated in FIG. 1, it will be appreciated that the E-UTRAN 100 could comprise any suitable number of UE devices.

The evolved packet core (EPC) 200 comprises a first mobility management entity (MME) 202 and a second mobility management entity (MME) 204, although it will be appreciated that any suitable number of mobility management entities (MMEs) could be used. In examples, the MME 202 and the MME 204 are operable to manage functions such as mobility for tracking, paging, roaming, handovers, control and signalling functions for managing access of the UE devices to network connections, and session and subscriber management and the like. Each MME is associated with a Serving Gateway (S-GW) and a Packet Data Network (PDN) Gateway (P-GW). In examples, each eNodeB or MME is operable to communicate with one or more other eNodeBs or MMEs as indicated by the dotted lines in FIG. 1 according to known techniques. In examples, an interface between an eNodeB and an MME is referred to as an S1 interface. An S1 interface allows communication between an eNodeB and an MME, for example, as described according to 3GPP LTE. In examples, an interface between an eNodeB and another eNodeB is referred to as an X2 interface. An X2 interface allows communication between an eNodeB and another eNodeB, for example, as described according to 3GPP LTE.

The Serving Gateway (S-GW) of each MME can be thought of as a node which delineates the E-UTRAN from core networks and is operable to maintain data paths between eNodeBs and the respective PDN Gateway. In other words, the Serving Gateway (S-GW) can be thought of as an interface between the E-UTRAN 100 and a packet data network. The PDN Gateway (P-GW) of each MME can be thought of as a node which delineates the packet data network interface from packet data networks, such as the internet. The E-UTRAN 100 and the EPC 200 cooperate together to facilitate operation of the network. Operation of an evolved packet core and E-UTRAN, such as those illustrated in FIG. 1, are known, for example based on 3GPP LTE specifications, and so will not be described in further detail herein.

In examples, each eNodeB is associated with a respective cell which corresponds to a physical area in which one or more UE devices may communicate with that eNodeB. Many factors may affect the performance of a cell and the performance of a cell may be measured in different ways. Factors which may influence the performance of a cell include the physical location of the eNodeB and its environment, number of UE devices within the cell which are communicating with the eNodeB, data capacity of the eNodeB and the like.

For example, as mentioned above, a plurality of Key Performance Indicators (KPIs) may be used to determine the performance of a cell. As an example, the Key Performance Indicators could include a quality of service indicator, number of bits per second, and the like. By analysing the Key Performance Indicators, a cellular operator may be able to determine areas of high interference (e.g. in which signal quality is degraded to below a threshold quality level), sleeping cells, hot spots, and/or poor design, which may lead to low resource efficiency (e.g. a number of bits per second is below a threshold number of bits per second).

However, in order to determine which factors influence the performance of the cell, for example to detect areas of high interference, sleeping cells, hot spots, poor design and the like, an engineer would typically have to analyse each KPI to try to determine which KPI was having the most effect on performance. Once this is determined, a cellular operator may wish to perform cell optimisation, for example by reconfiguring settings of the eNodeB, physical re-arrangement of equipment at the eNodeB, capacity augmentation so as to increase the capacity of a cell, and the like. However, this can be time consuming for the engineer and costly for the cellular operator due to the complexity of analysing the KPIs.

Accordingly, in examples, a so-called Q-score is measured which provides an indication of the performance of the cell. Techniques for generating the Q-score will be described in more detail below.

In summary, a data efficiency of data passing through a physical layer in a protocol stack (for example, implemented in an eNodeB) via one or more higher layers in the protocol stack is calculated based on a comparison of a physical resource data unit allocated to that data at the physical layer with a data throughput of one or more of the layers of the protocol stack. An average efficiency is then calculated by averaging the data efficiency over a predetermined time and the average efficiency is normalised with respect to a predetermined efficiency so as to generate a normalised average efficiency. The normalised average efficiency is compared with a target efficiency and the operation of the cell is adjusted if the normalised average efficiency differs from the target threshold by greater than a threshold amount. In examples, the Q-score corresponds to the normalised average efficiency and is indicative of the performance of the cell.

An example of a protocol stack implemented by an eNodeB such as eNodeB 102, 104, 106, and/or 108 will now be described with reference to FIG. 2.

Figure 2:
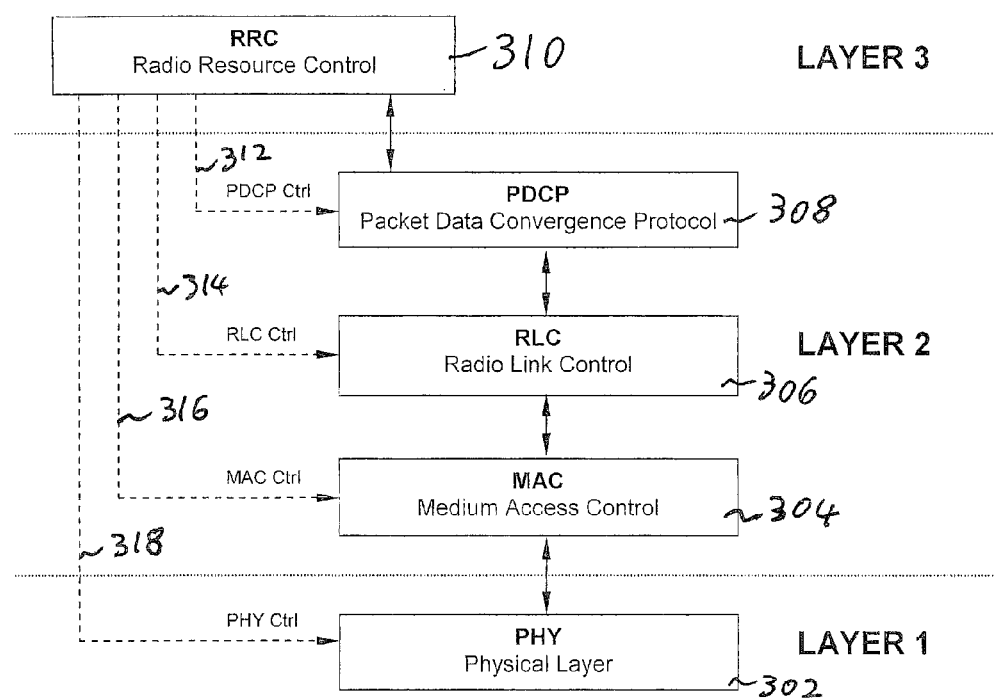
FIG. 2 is a schematic diagram of a protocol stack.

FIG. 2 schematically illustrates an example of a protocol stack. In the example shown in FIG. 2, the protocol stack comprises three layers: layer 1; layer 2; and layer 3. Layer 1 comprises a physical (PHY) layer 302. Layer 2 comprises three layers, which correspond to a Medium Access Control (MAC) layer 304, a Radio Link Control (RLC) layer 306, and a Packet Data Convergence Protocol (PDCP) layer 308. Layer 3 comprises a Radio Resource Control (RRC) layer 310. Each of the layers 302, 304, 306, 308 and 310 is operable to communicate data with an adjacent layer.

For example, the MAC layer 304 is operable to communicate with the PHY layer 302 and RLC layer 306. In examples, the RRC layer 310 is operable to send control data to the layers. As illustrated in the example of FIG. 2, the control data comprises: a control signal PDCP Ctrl which controls the PDCP layer 308 as indicated by dashed line 312; a control signal RLC Ctrl controls the RLC layer 306 as indicated by dashed line 314; a control signal MAC Ctrl which controls the MAC layer 304 as indicated by dashed line 316; and a control signal PHY Ctrl which controls the PHY layer as indicated by dashed line 318. In examples, the control data generated by the RRC layer 310 facilitates control of data flow of the respective layers.

In examples, the Q-score is generated by each eNodeB for its respective cell and Q-score data is sent to a Q-score analysis server for analysis by the cellular operator. In examples, the Q-score is generated by detecting the data throughput (for example in Mbps Mbits per second) and the number of physical resource data units allocated to that data. In example implementations, the number of physical resource data units allocated to the data is detected by the eNodeB.

In examples, the Q-score analysis server comprises a general purpose computer system (such as the one described below with reference to FIG. 3) for analysing the performance of one or more cells based on the respective Q-scores. However, it will be appreciated that the analysis could be carried out by other appropriate computing devices implementing appropriate software or by one or more dedicated hardware devices such as an application specific integrated circuit (ASIC) or field programmable gate array (FPGA).

In some examples, each eNodeB is operable to detect the data throughput and the number of allocated physical resource data units. Additionally, each eNodeB is operable to send data throughput data indicative of the data throughput and data indicative of the number of allocated physical resource data units to the Q-score server for analysis. In other examples, each eNodeB is operable to generate the Q-score based on the detected data throughput and the number of allocated physical resource data units. A way in which the Q-score is generated will be described in more detail later below.

Figure 3:
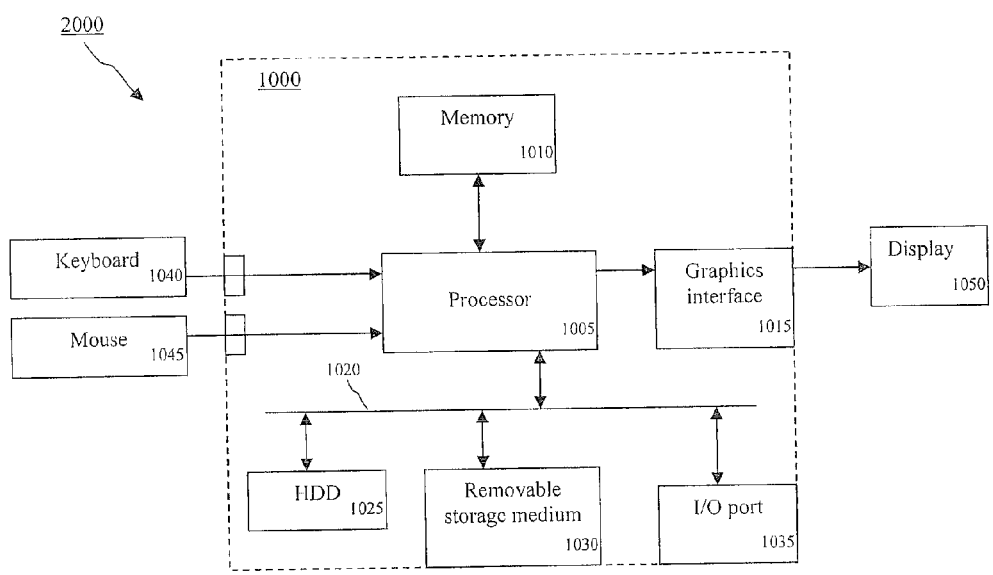
FIG. 3 is a schematic diagram of a computer system.

FIG. 3 schematically illustrates a computer system 2000 which, in examples, can act as a Q-score analysis server. The computer system 2000 comprises a system unit 1000, and a plurality of peripheral devices. The system unit 1000 comprises: a processor 1005; a memory 1010; a graphics interface 1015; a data bus 1020; a hard disc drive (HDD) 1025; a removable storage medium drive 1030; and an input/output (I/O) port 1035. The peripheral devices comprise a keyboard 1040; a mouse 1045; and a display 1050.

The processor 1005 is operable to receive control signals from the keyboard 1040 and mouse 1045 so as to control operation of the system unit 1000. However, it will be appreciated that other suitable input devices may be used to control operation of the system unit 1000 such as a track ball, touch input device (e.g. in cooperation with the display 1050), and the like.

The processor 1005 is operable to communicate bidirectionally with the hard disc drive 1025, removable storage medium 1030, and input/output port 1035 via the data bus 1020. In some examples, the removable storage medium is a DVD-ROM although it will be appreciated that other suitable removable storage media such as CD-ROM, CD-R, CD-RW, DVD-R, DVD-RW, Blu-ray disc, memory stick, and the like could be used. Software for controlling the system unit may be stored on the HDD 1025 and/or the removable storage medium 1030 in accordance with known techniques.

The input/output port 1035 is operable to allow the system unit to communicate with one or more peripheral devices, such as a printer, scanner, memory stick, and the like, although it will be appreciated that any suitable peripheral device could be used. In some examples, the input/output port 1035 comprises a universal serial bus (USB) port for communicating according to a USB protocol. However, it will be appreciated that the input/output port 1035 could comprise any other suitable interface (wired or wireless e.g. IEEE 1394, IEEE802.11, ethernet and the like) and allow the system unit 1000 to communicate according to any suitable protocol. In some examples (not shown), the system unit comprises a network interface (wired or wireless) for communicating with a network such as the internet or a local area network (LAN), although any suitable network interface could be used.

The processor 1005 is operable to write data to and/or read data from the memory 1010 according to known techniques so as to allow the processor 1005 to implement instructions to control operation of the system unit. In some examples, the memory 1010 comprises dynamic random access memory (DRAM) although it will be appreciated that any other suitable form of memory could be used.

The processor 1005 is operable to generate graphics data and communicate the graphics to the graphics interface 1015. In response to the graphics data generated by the processor 1005, the graphics interface is operable to generate control signals to control the display of the graphics data on the display 1050.

In some examples (not shown), the system unit 1000 comprises an audio interface and the processor 1005 is operable to generate audio data to cause the audio interface to output the audio data to a suitable audio reproduction device, such as one or more loud speakers, headphones and the like, although it will be appreciated that any other suitable audio reproduction device could be used.

Although FIG. 3 shows an example of a general purpose computer which may be used to implement the examples described herein, it will be appreciated that other suitable general purpose computers could be used to implement the described examples.

A method of generating a Q-score according to example implementations will now be described with reference to FIG. 4.

Figure 4:
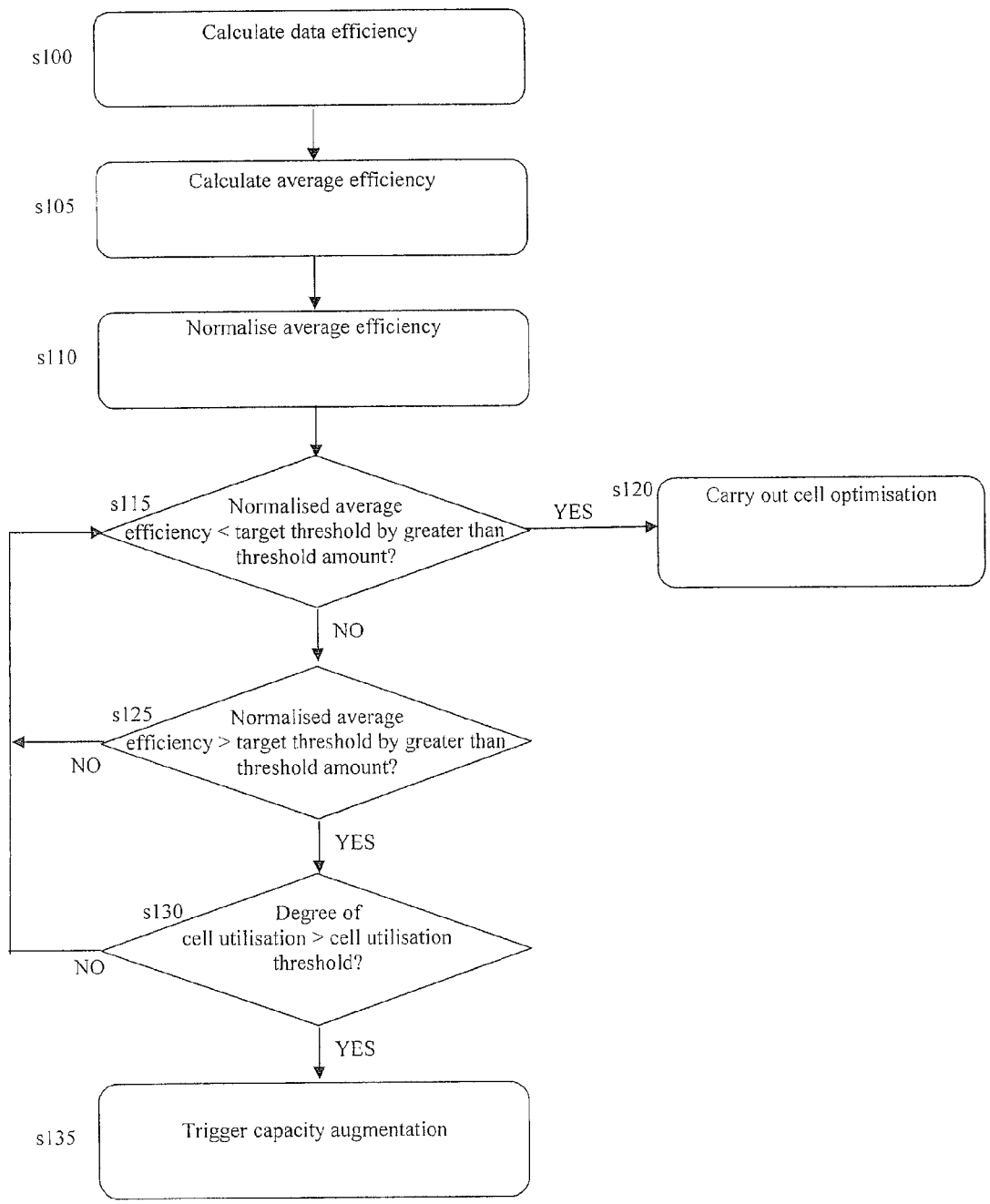
FIG. 4 is a flowchart of a method for assessing the performance of a cell in a network.

FIG. 4 is a flowchart of a method for assessing the performance of a cell in a network. At a step s100, the system unit 1000 calculates a data efficiency of data passing through a physical layer in a protocol stack via one or more higher layers in the protocol stack based on a comparison of a physical resource data unit allocated to that data at the physical layer with a data through put of one or more of the layers of the protocol stack.

Referring to FIG. 2, in example implementations, the system unit calculates the data efficiency based on the data passing through the PHY layer 302 from the RLC layer 306 in a downlink according to equation 1 below. In this example, the physical resource data unit corresponds to a physical resource block (PRB) according to the 3GPP LTE standard, although it will be appreciated that the techniques described herein may be applied more generally to other types of physical resource data unit and other types of protocol stacks as appropriate according to other telecommunications standards.

$$\mu_{PRB\_DL} = \frac{T_{RLC\_DL}}{N_{PRB\_DL}} \qquad \text{Equation 1}$$

In equation 1 above, $\mu_{PRB\_DL}$ is the PRB Efficiency in Mbits per second (Mbps) per PRB (Mbps/PRB) in the downlink, $N_{PRB\_DL}$ is the number of PRBs allocated to data in the downlink, and $T_{RLC\_DL}$ is the total RLC Protocol level throughput in the downlink (in Mbits per second).

Although equation 1 above relates to the downlink and the radio link control (RLC) layer, it will be appreciated that the data throughput could relate to one or more layers in the protocol stack. For example, the total data throughput of the PDCP layer 308, RLC layer 306 and the MAC layer 304 could be used, or a customer experience metric could be based on application layer data throughput. However, it will be appreciated that any suitable combinations of one or more layers could be used. Additionally, it will be appreciated that the efficiency could be calculated in a similar manner in the uplink, for example according to equation 2 below.

$$\mu_{PRB\_UL} = \frac{T_{RLC\_UL}}{N_{PRB\_UL}} \qquad \text{Equation 2}$$

In equation 3, $\mu_{PRB\_UL}$ is the PRB Efficiency in Mbps/PRB in the uplink, $N_{PRB\_UL}$ is the number of PRBs allocated to data in the uplink, and $T_{RLC\_UL}$ is the total RLC Protocol level throughput in the uplink (in Mbits per second).

Then, at a step s105, the system unit 1000 is operable to calculate an average efficiency by averaging the data efficiency over a predetermined time. In example implementations, the average efficiency in the downlink is calculated according to equation 3 below.

$$\mu_{PRB\_DL\_AVG} = \sum_{n=1}^{n} \frac{\mu_{PRB\_DL}(TTI_n)}{N_{TTI}} \quad \text{Equation 3}$$

In equation 3, $\mu_{PRB\_DL\_AVG}$ is the average PRB efficiency in Mbits per second per PRB in the downlink, $\mu_{PRB\_DL}(TTI_n)$ is the efficiency calculated according to equation 1 at a TTI (transmission time interval) n, and $N_{TTI}$ is the total number of transmission time intervals in the summation n=1 . . . n. The transmission time interval is the duration of time for an independently decodable transmission on the radio link, for example the time taken to transmit a physical resource block in the time domain. In examples, such as implementation of 3GPP LTE, the transmission time interval is 1 ms, although it will be appreciated that other suitable transmission time intervals could be used. For example, so-called "LTE advanced" uses TTI=0.5 ms.

In some example implementations, N=1000 so that a period of time over which the average efficiency $\mu_{PRB\_DL\_AVG}$ is measured corresponds to 1 second. However, it will be appreciated that N could be any other suitable number. In some example implementations, the average efficiency $\mu_{PRB\_DL\_AVG}$ is recorded as a binned cumulative distribution function (CDF) over a predetermined period time, such as 15 minutes (900 seconds), although it will be appreciated that the predetermined time could be any other suitable time period, such as 10 minutes, 20 minutes, 30 minutes, 40 minutes, and the like.

In examples, the CDF is generated by first binning the sum of the respective average efficiencies (for example $\mu_{PRB\_DL\_AVG}$) into PRB bins of bin size PRB=1 for number of allocated PRBs=0 . . . b so as to generate a first CDF (where b is the maximum number of allocated PRBs). Then a second binning is performed using the same bin size and number of bins (bin size=1 PRB, number of allocated PRBs=0 . . . b) with each bin containing a count of the number of values included in each bin for the first CDF so as to generate a second CDF. A combined CDF output is then generated by, for each bin (number of allocated PRBs=0 . . . b), dividing the average efficiency value for that bin as indicated by the first CDF by the count of the number of values for that bin as indicated by the second CDF. In some examples, the maximum number of allocated PRBs b=100 although it will be appreciated that any other suitable number could be used. Additionally, although in the example described above, the bin size is PRB=1, it will be appreciated that any other bin size could be used. The generation of the CDF will be described in more detail below with reference to FIG. 10.

In these example implementations, the average efficiency over the predetermined period as determined from the respective CDF for that predetermined time period is calculated and CDF efficiency data indicative of the average efficiency over the predetermined time period is stored in memory (e.g. memory 1010), although it will be appreciated that the CDF efficiency data may be stored in any appropriate way.

However, the average efficiency $\mu_{PRB\_DL\_AVG}$ when considered in isolation, may not provide a cellular operator with a satisfactory indication of whether a cell is performing well or not; each cell may have different factors which influence how well it is expected to perform and therefore an ideal average efficiency for each cell may well vary from cell to cell. In this context, "ideal" average efficiency should be taken to mean a theoretical maximum efficiency that the cell should be able to achieve. Additionally, the theoretical maximum efficiency for the downlink is likely to be different from the theoretical maximum efficiency for the uplink, although it will be appreciated that they could be the same. The theoretical maximum efficiency for the downlink and/or uplink may be influenced by one or more of:

1. a signal to interference ratio across the cell;
2. terminal locations within the cell;
3. a hybrid automatic repeat request (HARQ) retransmission rate;
4. a multiple input multiple output (MIMO) configuration;
5. system bandwidth; and
6. medium access control (MAC) layer scheduler efficiency.

In examples relating to 3GPP LTE, the HARQ is similar to that defined for high speed downlink packet access (HSDPA) according to enhanced 3G (also referred to as 3.5G, 3G+, or turbo 3G). Additionally, the MAC layer scheduler efficiency can be thought of as relating to Layer 2 for 3GPP LTE block level protocol over air (for example, corresponding to Layer 2 of FIG. 2).

Referring back to FIG. 4, at a step s110, the average efficiency is normalised with respect to the theoretical maximum efficiency according to equation 4 below so as to provide a "Q-score" indicative of the performance of a cell.

$$Q_{RLC\_DL} = \frac{\mu_{PRB\_DL\_AVG}}{\mu_{PRB\_DL\_100\%}} \quad \text{Equation 4}$$

In equation 4 above, $\mu_{PRB\_DL\_AVG}$ is calculated as described above in relation to Equation 3, $\mu_{PRB\_DL\_100\%}$ is the theoretical maximum efficiency in the downlink, and $Q_{RLC\_DL}$ is the Q-score for the radio link control layer in the downlink.

More generally, equations 1 to 4 above can be generalised as:

$$\mu_{PRB} = \frac{T}{N_{PRB}} \quad \text{Equation 5}$$

$$\mu_{PRB\_AVG} = \sum_{n=1}^{n} \frac{\mu_{PRB}(TTI_n)}{N_{TTI}} \quad \text{Equation 6}$$

$$Q = \frac{\mu_{PRB\_AVG}}{\mu_{PRB\_100\%}} \quad \text{Equation 7}$$

where: $\mu_{PRB}$ is the data efficiency of data passing through the physical layer via one or more higher layers (e.g. for uplink and/or downlink); T is the data throughput of one or more layers of the protocol stack; $\mu_{PRB\_AVG}$ is the average data efficiency over a predetermined time (in this example, the predetermined time corresponds to $N_{TTI} \times n$ as defined above for equation 3, although in other examples the predetermined could be the predetermined time period over which the CDF is calculated); $\mu_{PRB}(TTI_n)$ is the calculated data efficiency according to equation 5 at a particular TTI n; $N_{TTI}$ and n are as defined above for equation 3; Q is a Q-score which corresponds to a normalised average efficiency of the cell and is indicative of the performance of the cell; and $\mu_{PRB\_100\%}$ is a normalisation value. In other words, equations 5, 6, and 7 can be thought of as generalised respective versions of equations 1 (and 2), 3, and 4 above.

In examples, an engineer may calculate the theoretical maximum efficiency (for example, based on the factors 1 to 6 mentioned above with respect to the maximum theoretical efficiency) and set the normalisation value $\mu_{PRB\_100\%}$ to correspond to the calculated theoretical efficiency. In other examples, a desired maximum throughput at 100% utilisation of the cell (for example, corresponding to a throughput that the cellular operator would like to achieve when the cell is operating at maximum capacity) may be divided by the maximum number of physical resource blocks supported. For example, if the desired maximum throughput is 60 Mbits per second (60 Mbps) and the maximum number of PRBs is 50, then the normalisation value $\mu_{PRB\_100\%}$ would correspond to 60 Mbps/50=1.2 Mbps/PRB.

In some examples, the normalisation value $\mu_{PRB\_100\%}$ corresponds to the theoretical maximum value plus or minus a user defined efficiency offset $\mu_{100\%\_OFFSET}$. In some examples, a user defined target threshold offset $\text{Thr}_{Offset}$ is defined with respect to a Q-score target threshold (such as that described in more detail below).

In examples, the value $\mu_{PRB\_100\%} \pm \mu_{100\%\_OFFSET}$ and/or the user defined target threshold offset $\text{Thr}_{Offset}$ is sent to one or more eNodeBs. This allows a cellular operator to specify a Q-score (for example 80%) which they would like to have apply across their network of eNodeBs but take into account known problematic regions. For example, one or more cells (and hence associated eNodeBs) could be located close to a source which causes interference in the cell, and/or the cell may be located close to, or within, terrain which degrades a signal transmission path, such as hills, trees and the like. The user defined efficiency offset $\mu_{100\%\_OFFSET}$ and/or user defined target threshold offset $\text{Thr}_{Offset}$ can also allow a cellular operator to take cell variability into account. The user defined efficiency offset $\mu_{100\%\_OFFSET}$ and the user defined target threshold offset $\text{Thr}_{Offset}$ are collectively referred to herein as user defined offsets.

The user defined offsets also allow hysteresis to be taken into account when detecting transient states from "well optimised" to "poorly optimised" in a similar manner to a generalised hand-over process. This will be described in more detail later below with reference to FIG. 11.

Additionally, where the utilisation of a cell is low (for example in situations where the utilisation is below a utilisation threshold), the Q-score is likely to have a large standard deviation (i.e. one standard deviation σ is greater than a predetermined Q-score e.g. 1σ>Q-score=30% although it will be appreciated that any other suitable value could be used). Therefore, it is likely that the Q-score may be below a target threshold for some of the time, due to random variation in the measured Q-score. The user defined offset will be described in more detail later below, with reference to FIG. 11.

Referring to FIG. 4, at a step s115, if the normalised average efficiency (i.e. the Q-score for a cell) is less than a target threshold by greater than a threshold amount, then, at a step s120, a cell optimisation procedure may be triggered. In some examples, the target threshold is 80% (normalised average efficiency, i.e. Q-score) and the threshold amount is zero. In some examples, the threshold amount is 5%, although it will be appreciated that any suitable target threshold and threshold amount could be used. Therefore, in the case of the threshold amount being zero, if the Q-score is less than 80%, then cell optimisation may be carried out, for example, by altering parameters governing the operation of a cell until the Q-score is greater than the target threshold.

In some examples, if the normalised average efficiency (i.e. the Q-score for a cell) is less than the target threshold by greater than the threshold amount an OSS (operations support system) alarm may be triggered to alert a cellular operator that cell optimisation should be carried out. In some example implementations, the cell optimisation is carried automatically by the OSS in response to receiving data indicating that cell optimisation should be carried out.

If, at the step s115, it is determined that the normalised average efficiency is not less than the target threshold by greater than the threshold amount, then, at a step s125, it is determined if the normalised average efficiency (Q-score) is greater than the target threshold by greater than the threshold amount. As mentioned above, in some examples, the threshold amount is zero, although it will be appreciated that other suitable values could be used. If the normalised average efficiency (Q-score) is not greater than the target threshold by greater than the threshold amount, then processing returns to the step s115.

However, if at the step s125 the normalised average efficiency (Q-score) is greater than the target threshold by greater than the threshold amount, at a step s130 it is determined if a degree of cell utilisation is greater than a cell utilisation threshold $UTIL_{thrs}$. In this context, cell utilisation should be taken to mean the mean average number of allocated PRBs as a percentage of the maximum number of PRBs which may be allocated, where the mean average is taken over a predetermined time (τ). In examples, the degree of cell utilisation is given by equation 8 below.

$$UTIL = \frac{SR}{\tau} \sum_{t=0}^{\tau} \frac{N_{PRB}(t)}{PRB_{MAX}} \qquad \text{Equation 8}$$

In equation 8, UTIL is the degree of cell utilisation, $N_{PRB}(t)$ is the number of allocated PRBs at a time t, and $PRB_{MAX}$ is the maximum number of PRBs which may be allocated, τ is the predetermined time over which UTIL is calculated, and SR is the time between each measurement of $N_{PRB}(t)$. In the example of 3GPP LTE, $PRB_{MAX}=100$, although it will be appreciated that $PRB_{MAX}$ could be any other suitable value. In some examples, SR is an integer multiple of the TTI and $N_{PRB}(t)$ is measured each integer multiple of the TTI, although it will be appreciated that $N_{PRB}(t)$ could be measured at any other suitable time interval SR.

In some examples, the cell utilisation threshold $UTIL_{thrs}=0.8$ (which corresponds to a degree of cell utilisation of 80%). If the degree of cell utilisation UTIL is greater than the cell utilisation threshold $UTIL_{thrs}$, then the cell is said to be highly utilised. In some examples, a low cell utilisation threshold $UTIL_{thrsL}$ corresponds to $UTIL_{thrsL}=0.1$ (which corresponds to a degree of cell utilisation of 10%) and if the degree of cell utilisation is less than the low cell utilisation threshold $UTIL_{thrsL}$, the utilisation of the cell is said to be low. However, it will be appreciated that any other suitable values for the cell utilisation threshold $UTIL_{thrs}$ and the low cell utilisation threshold $UTIL_{thrsL}$ may be used.

In examples, the degree of cell utilisation may also depend on the number of users. For example, if $PRB_{MAX}=100$, and there is only one UE device, which has a PRB allocation of PRB=100 over the predetermined time period, then a total mean average PRB allocation is likely to be 100 and the cell utilisation threshold is likely to be exceeded (i.e. the degree of utilisation of the cell would be high). Similarly, if there are 100 UE devices each allocated 1 PRB over the predetermined time period, then a total mean average PRB allocation would be likely to be 100. It will be appreciated that the cell utilisation threshold $UTIL_{thrs}$ and the low cell utilisation threshold $UTIL_{thrsL}$ may depend on the settings set by the cellular operator and/or vendor, and/or the bandwidth of each cell.

If the degree of cell utilisation UTIL is not greater than the cell utilisation threshold $UTIL_{thrs}$, then processing returns to the step s115. However, if, at the step s130, the degree of cell utilisation UTIL is greater than the cell utilisation threshold $UTIL_{thrs}$, e.g. the cell is at or near full capacity, then, at a step s135 a capacity augmentation procedure is triggered, for example, by flagging up that the capacity of the cell needs to be increased. In this context, capacity augmentation could include, adding more carriers, adding new features and the like. In this case, as the cell is likely to be operating to a desired efficiency, it would be difficult to improve its performance by improving its efficiency. Therefore, capacity augmentation may be carried out. For example, to improve the capacity of the cell, additional MIMO layers may be added, in-fill sites may be provided, so called "femto" and/or "pico" cells may be provided, one or more distributed antenna systems (DAS) may be provided and the like. In other words, capacity may be augmented by providing additional hardware and/or spectrum for data transmission.

In some examples, so-called "PRB licensing" may be implemented. For example, a cellular operator may provide a maximum PRB allocation of 150 PRBs, but licence 50 PRBs to a vendor. This corresponds to a 33.3% PRB licence, although it will be appreciated that other percentage licences could be used. In order to increase capacity, a vendor may negotiate a PRB licence with a cellular operator which provides a larger maximum PRB allocation, for example, 100 PRBs. In this example, the PRB licence would then correspond to a 66.6% licence and the capacity of the cell would be able to be doubled. Therefore, in examples, capacity augmentation could be carried out by modification of a PRB licence.

The present technique recognises that, if the Q-score is low (i.e. the normalised average efficiency is less than the target threshold by the threshold amount), there may be little point in carrying out capacity augmentation before cell optimisation because the normalised average efficiency indicates that the cell is performing below a desired level. However, if for example, the cell utilisation threshold is 50%, the degree of cell utilisation is greater than 50%, and the Q-score is high (i.e. the normalised average efficiency is greater than the target threshold by greater than the threshold amount), then an alarm for capacity augmentation may be triggered.

In other words, the threshold amount can be thought of as defining a range within which a cell is said to be performing satisfactorily. If the normalised average efficiency (Q-score) is outside the range, then cell optimisation (step s120) or capacity augmentation (step s135) is carried out. More generally, the Q-score (normalised average efficiency) may be used to determine whether operation of a cell should be adjusted. This will now be described in more detail below with reference to FIG. 5.

Figure 5:
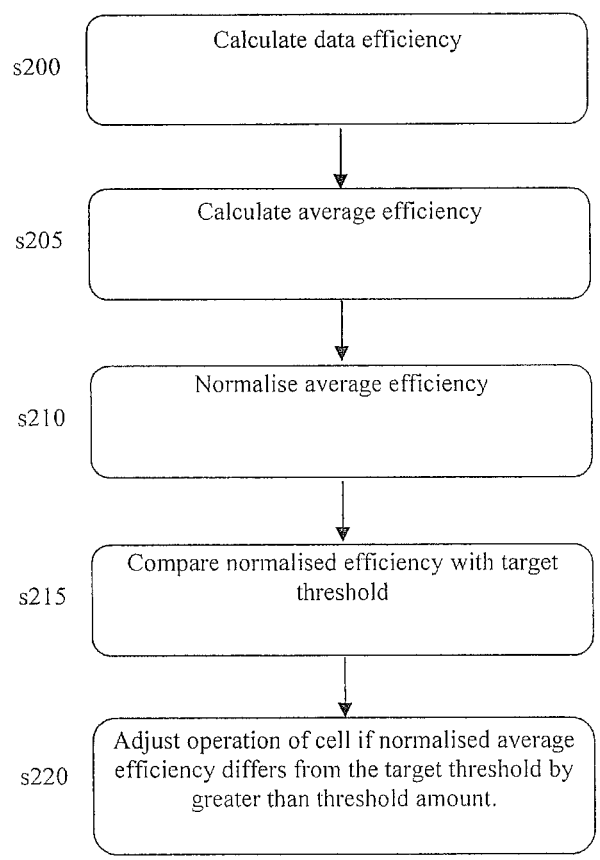
FIG. 5 is a flowchart of a method for assessing the performance of a cell in a network.
Figure 6:
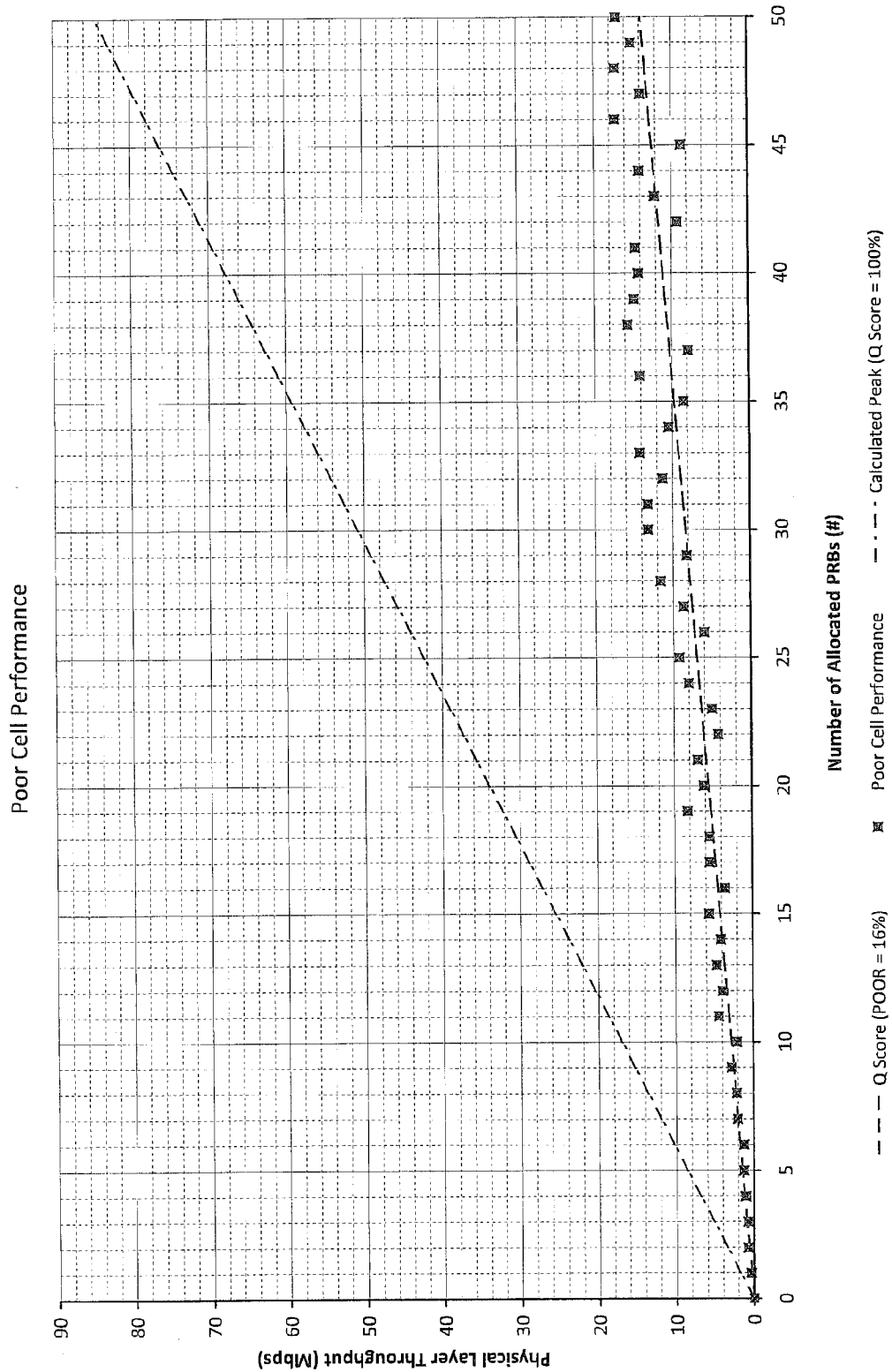
FIG. 6 is a plot showing data throughput of a cell having poor performance.

FIG. 5 is a flowchart of a method for assessing the performance of a cell in a network. In the example shown in FIG. 5, the steps s200, s205 and s210 are the same as those described above with reference to FIG. 4. At a step s215, the normalised average efficiency (Q-score) is compared with a target threshold, for example in a similar manner to that described above with reference to FIG. 4. At a step s220, the operation of a cell is adjusted if the normalised average efficiency differs from the target threshold by greater than the threshold amount, for example, as described above with reference to FIG. 4.

Figure 7:
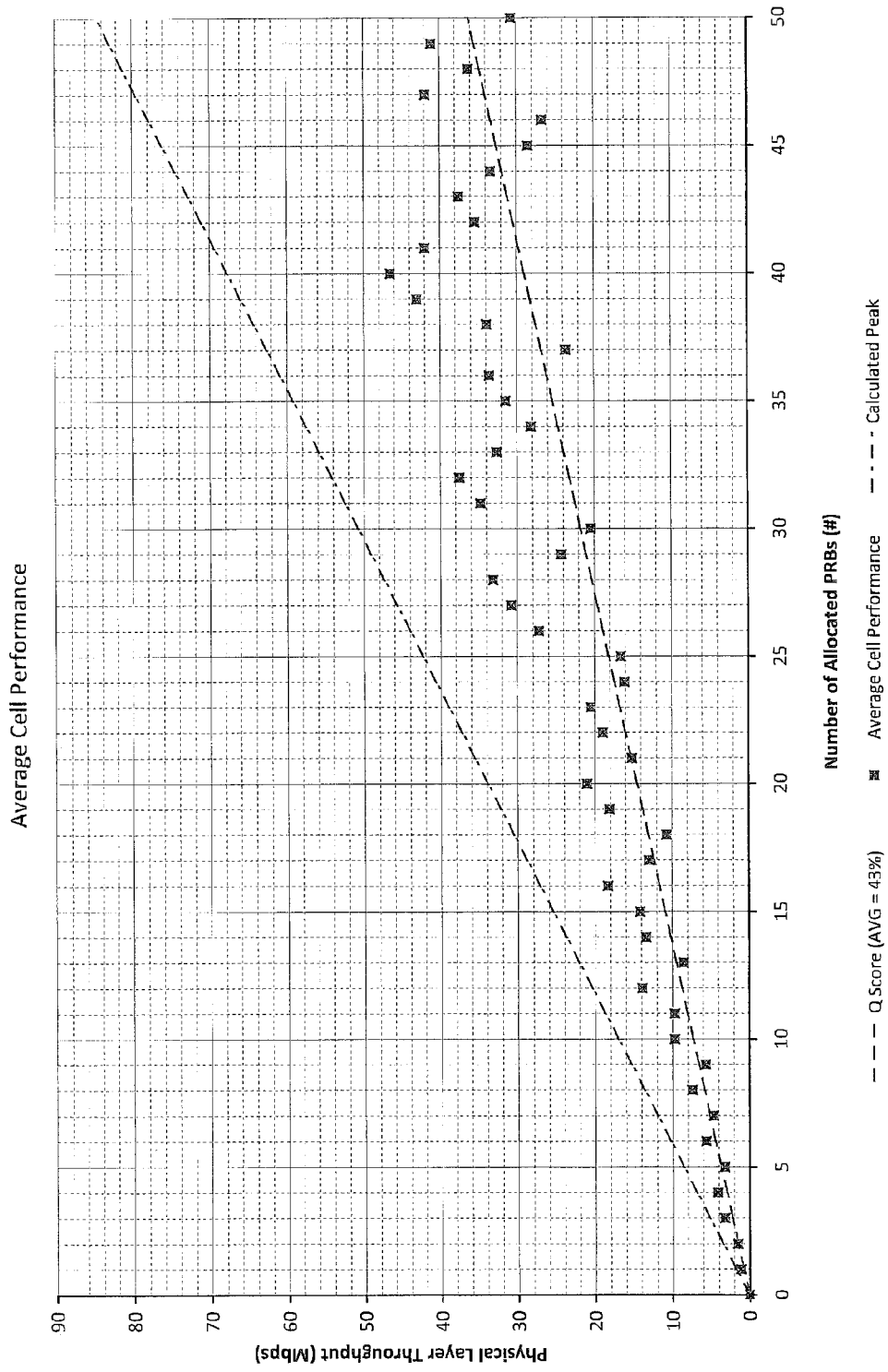
FIG. 7 is a plot showing data throughput of a cell having average performance.
Figure 8:
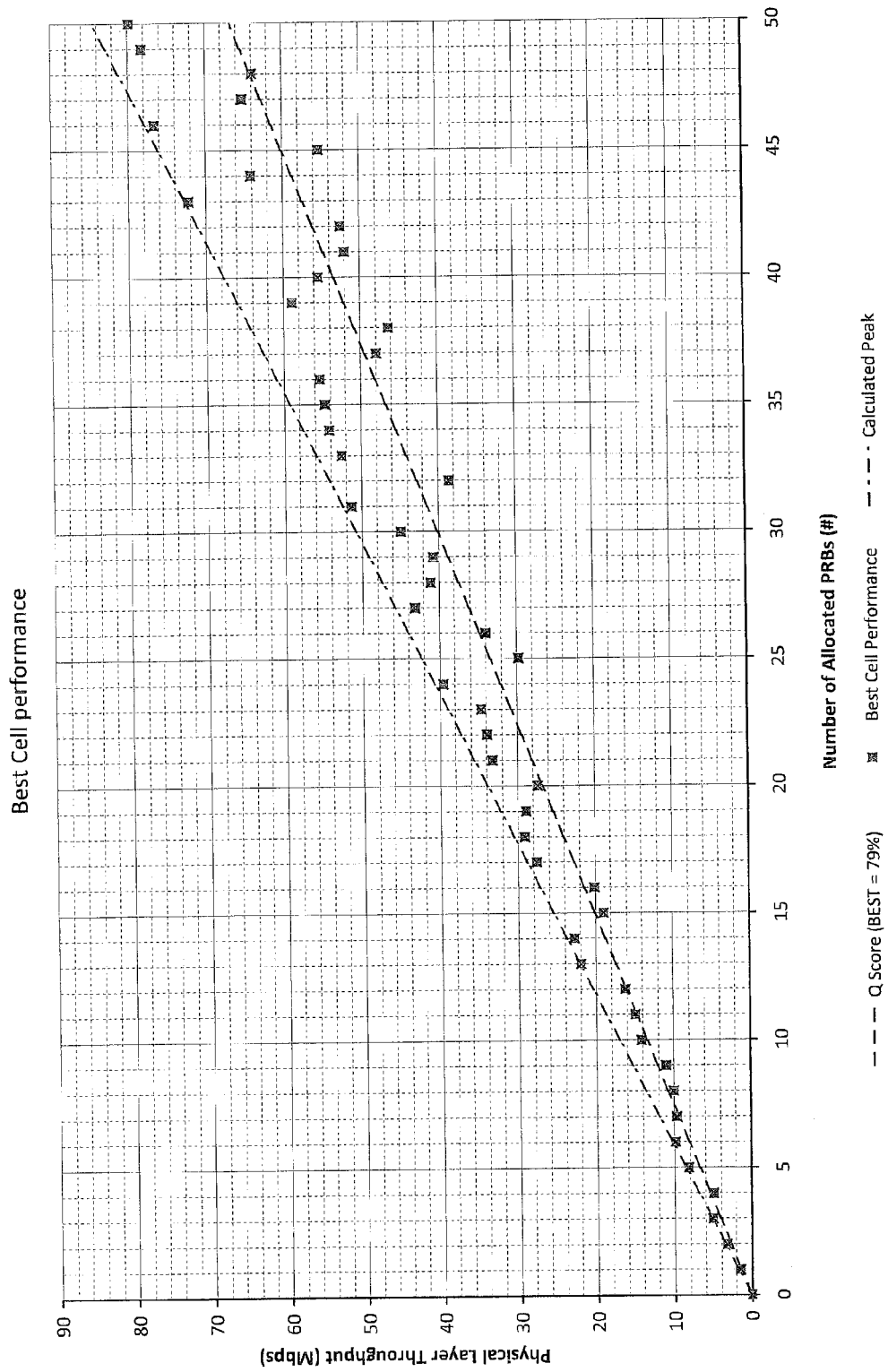
FIG. 8 is a plot showing data throughput of a cell having best performance.
Figure 9:
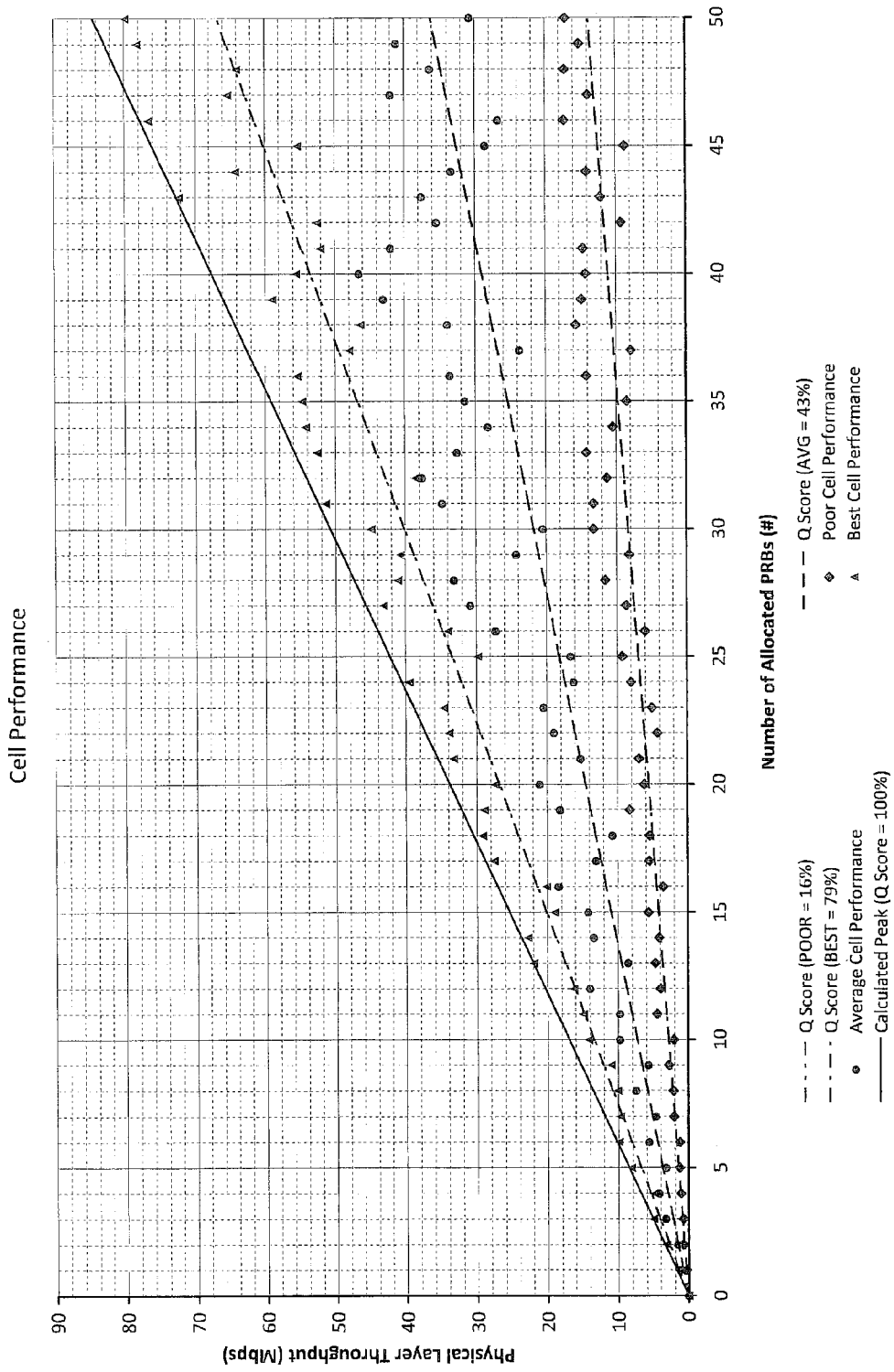
FIG. 9 is a plot showing data throughput relating to poor cell performance, average cell performance, and best cell performance.

Some examples of simulated performance of a cell will now be described with reference to FIGS. 6 to 9. As mentioned above, FIG. 6 is a plot showing data throughput of a cell having poor performance; FIG. 7 is a plot showing data throughput of a cell having average performance; FIG. 8 is a plot showing data throughput of a cell having best performance; and FIG. 9 is a plot showing data throughput relating to poor cell performance, average cell performance, and best cell performance.

In the examples of FIGS. 6 to 9, it is assumed that the variance in the throughput is 50% and a normal distribution has been applied to generate the simulated data. In the examples of FIGS. 6-9, a cell having poor performance is defined as one having a Q-score of 16% or less. As can be seen from FIG. 7, the Q-score of an average cell is 43% and a good performing cell has a Q-score of 79% or more. In other words, FIGS. 6-9 illustrate a poor performance threshold, an average performance threshold, and a good performance threshold. It will be appreciated that the values of the poor performance threshold, the average performance threshold, and the good performance threshold shown in FIGS. 6 to 9 are examples only and that other appropriate values could be used.

In some examples, each threshold (i.e. poor, average, good) is associated with alarm data which indicates the relationship of the measured Q-score to the respective threshold. For example, if the Q-score of a cell is below the poor performance threshold, poor performance alarm data may be generated and reported to the OSS. As another example, if the Q-score of a cell is above the good performance threshold, then good performance alarm data may be generated and reported to the OSS. In this case, it is unlikely that a cell is performing better than expected and so the generation of the good performance alarm data may indicate that the cell has low interference (for example due to being physically located away from sources of interference such as trees, buildings and the like) and/or that the cell may be performing well at expense of other cells in the vicinity. Therefore, the alarm data can assist a cellular operator in modifying operation of the network so as to improve efficiency, throughput, and the like. Furthermore, the Q-score can assist the cellular operator in planning capacity augmentation at an optimal time (for example based on steps s125 to s135 of FIG. 4).

As another example, for a so-called "Category 5" LTE device, the cell should be capable of a theoretical maximum throughput of 300 Mbps, based on a 20 MHz carrier, 64QAM, 4×4 MIMO, and zero HARQ retransmissions. For a Category 5 LTE device, the maximum number of allocated PRBs is 100. Therefore, the theoretical maximum average efficiency should be 300 Mbps/100=3 Mbps. However, it is unlikely that this will be achieved, because it is very unlikely that the system will be 100% efficient. For example, the use of 4×4 MIMO may not give a four fold increase in throughput (for example, due to channel conditions). Additionally, the number of HARQ retransmissions can reduce the efficiency as can a higher signal to interference plus noise ratio (SINR) which could lead to a lower modulation scheme order and additional coding overheads.

In some example implementations, the Q-score (normalised average efficiency) is calculated by each eNodeB based on measurements of throughput of one or more layers of the protocol stack at the eNodeB (during uplink and/or downlink communication) and the number of allocated PRBs for the data. The Q-score is then transmitted from each eNodeB to the EPC for analysis by an OSS platform (or operations management centre (OMC)).

In other example implementations, each eNodeB is operable to communicate the number of allocated PRBs and the measured throughput of the layers to the OSS platform (or OMC). The Q-score is then calculated by the OSS (or OMC) based on the data received at the OSS/OMC platform.

In some examples, in order to calculate the Q-score, an eNodeB detects the throughput of one or more layers in the protocol stack (for example in Mbits per second), together with the number of allocated PRBs for that data. The eNodeB may then generate plot data which allows the measured throughput (e.g. on the y-axis) to be plotted against the number of allocated PRBs (e.g. on the x-axis). The eNodeB is then operable to fit a straight line through the plot data with the origin set to zero and calculate the gradient of the line using known techniques such as a least squares fit. Rearranging equation 5 above gives $$T = \mu_{PRB} N_{PRB} \qquad \text{Equation 9}$$

Therefore, it can be seen that, by plotting throughput T (y axis) against number of allocated PRBs $N_{PRB}$ (x-axis), and fitting a straight line according to the straight line equation y=mx+c (with c=0), the gradient m in the straight line equation corresponds $\mu_{PRB}$ and is equivalent to the mean average efficiency. In other words, the calculated gradient is indicative of the average efficiency in a similar manner to equations 3 and 6.

In some examples, the gradient (i.e. the average efficiency) is normalised in a similar manner to equation 4 and 7 above by dividing the gradient (average efficiency) by the normalisation value $\mu_{PRB\_100\%}$ to give the Q-score in a similar manner to that described above. In these examples, the normalised gradient is treated as being the Q-score and the normalised gradient compared with the threshold gradient so as to provide an indication of how well the cell is performing in a similar manner to that described above with reference to FIGS. 6 to 9.

In some examples, the normalised gradient (Q-score) is used to provide an indication of when the operation of the cell should be adjusted in a similar manner to that described above with reference to FIGS. 4 and 5.

It will be appreciated that the methods for determining the Q-score from the gradient and/or from equations 1 to 7 could be combined as appropriate and that the Q-score could be used as appropriate to provide an indication of when the operation of the cell should be adjusted in a similar manner to that described above with reference to any of FIGS. 4, 5, and 6 to 9.

In some examples, a maximum cell capacity may be forecast based on the measured Q-score for that cell. For example, a MAC scheduler at the MAC layer 304 may allocate a portion of the maximum number of PRBs (for example between 3 and 10 PRBs) to the data in the downlink (and/or uplink), due to a low degree of utilisation of that cell. In this case, a KPI which relates to throughput may indicate a relatively low average throughput for that cell.

However, the use of a Q-score can allow the maximum average throughput to be estimated. Accordingly, in examples, plot data may be generated as described above which allows the measured throughput to be plotted against the number of allocated PRBs, and a straight line to be generated from the plot data whose gradient is indicative of the Q-score (e.g. in a similar manner to that described above with reference to equation 9). The fitted line is then extrapolated to go from zero to the maximum number of allocated PRBs, even if the detected number of allocated PRBs only relates to a portion of the maximum number of allocated PRBs (for example, measured number of allocated PRBs is between 3-10 PRBs for a maximum allocation of 100 PRBs). Therefore, throughput when all the PRBs are allocated can be estimated from the Q-score.

For example, if the measured Q-score is 50% and the average efficiency corresponding to a Q-score of 100% is 3 Mbps/PRB, then the measured average efficiency corresponds to 1.5 Mbps/PRB (Q-score=50%). Extrapolating this to $PRB_{MAX}=100$ would give an average throughput of 150 Mbps (1.5 Mbps/PRB×100) with all the PRBs allocated. Therefore, for this example, the estimated maximum throughput with all PRBs allocated would be 150 Mbps.

Accordingly, the maximum throughput can be estimated from the Q-score, even if the maximum throughput is not actually achieved (and so not measured). It will be appreciated that the estimation of the throughput given above is an example only and that any suitable maximum number of allocated PRBs ($PRB_{MAX}$) could be used and the measured Q-score used to estimate maximum throughput accordingly.

Figure 10:
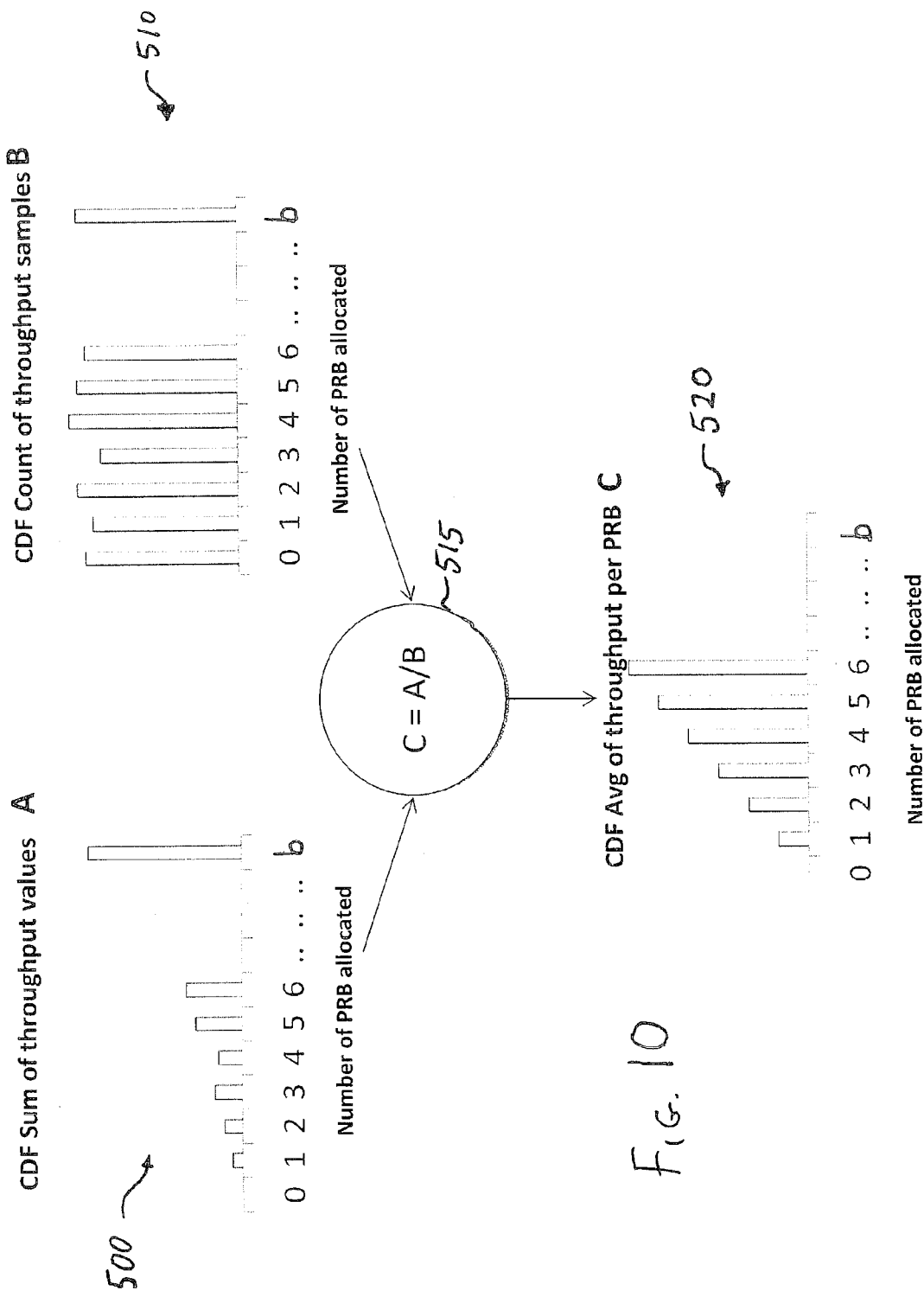
FIG. 10 is a schematic illustration of calculation of a cumulative distribution function.

As mentioned above, in some examples, a cumulative distribution function (CDF) is calculated. This will now be described in more detail with reference to FIG. 10. FIG. 10 shows a schematic illustration of calculation of the CDF according to example implementations.

As mentioned above, in examples, the CDF is generated by first binning the sum of the respective average efficiencies (for example $\mu_{PRB\_DL\_AVG}$) into PRB bins of bin size PRB=1 for number of allocated PRBs=0 . . . b so as to generate the first CDF (where b is the maximum number of allocated PRBs). This is schematically illustrated in FIG. 10 as CDF 500 (CDF Sum of throughput values A). In this example, the values of the CDF 500 are given by values A.

Then, as mentioned above, a second binning is performed using the same bin size and number of bins (bin size=1 PRB, number of allocated PRBs=0 . . . b) with each bin containing a count of the number of values included in each bin for the first CDF so as to generate a second CDF. In the example shown in FIG. 10, the second CDF is schematically illustrated as CDF 510 (CDF count of throughput samples B). In this example, the values of the CDF 510 are given by values B.

As illustrated in the example of FIG. 10, a combined CDF output (with values C) is then generated by, for each bin (number of allocated PRBs=0 . . . b), dividing the average efficiency value for that bin as indicated by the first CDF 500 (corresponding to values A) by the count of the number of values for that bin as indicated by the second CDF 510 (corresponding to values B). The combined CDF output is illustrated schematically in FIG. 10 by CDF 520 (CDF Avg of throughput per PRB C). In other words, shown schematically in circle 515 in FIG. 10, C=A/B. In other words, in example implementations, the CDF is generated according to the following pseudo-code:

For x=0 . . . b

CDF[x]==SUM[x]/COUNT[x]

where:
CDF[x] is the average throughput when x PRBs are allocated to a user (e.g. values C);
SUM[x] is the sum of all throughput samples when x PRBs are allocated to the user (e.g. values A);
COUNT[x] is the total number of samples when x PRBs are allocated to the user (e.g. values B); and
b is the maximum number of PRBs that may be allocated.

As mentioned above, in some examples, the maximum number of allocated PRBs is 100 (i.e. b=100) although it will be appreciated that any other suitable number could be used. Additionally, although in the examples described above, the bin size is PRB=1, it will be appreciated that any other suitable bin size could be used.

As mentioned above, in some examples, a user defined target threshold offset $Thr_{Offset}$ is defined with respect to the Q-score target threshold. This may be used to take any variation of the measured Q-score into account so that, in examples where a target threshold alarm is triggered when the Q-score is below the target threshold, the target threshold alarm is less likely to be repeatedly triggered due to a small variation of the Q-score above or below the target threshold. An example of this will now be described with reference to FIG. 11.

Figure 11:
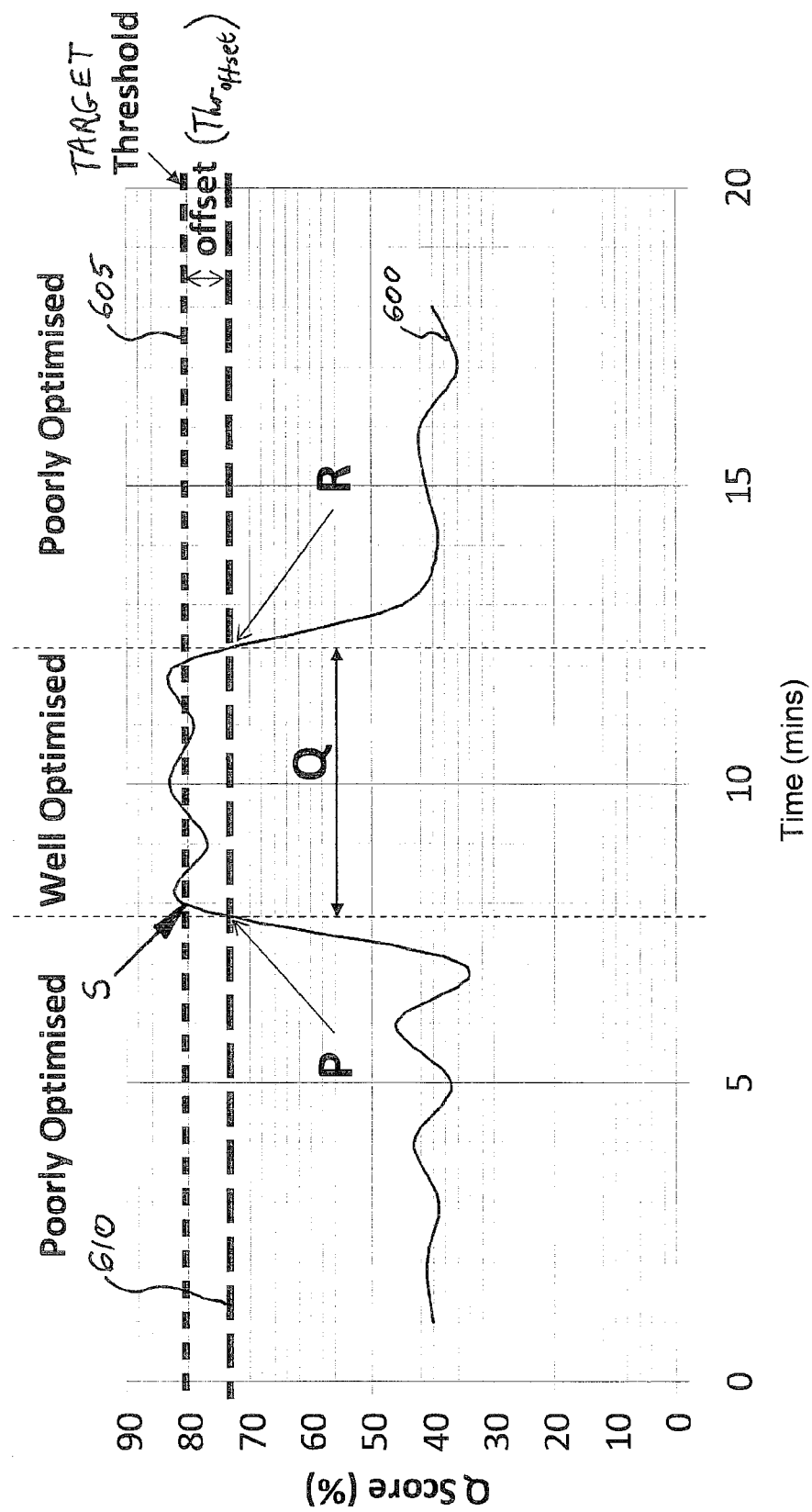
FIG. 11 is a schematic illustration of variation of cell performance with respect to time.

FIG. 11 is a schematic illustration of variation of cell performance with respect to time. In particular, FIG. 11 shows a Q-score (y-axis) plotted against time (x-axis) with a variation in Q-score indicated by line 600. In the example shown in FIG. 11, a target threshold is indicated by dashed line 605 corresponding to a Q-score of 80%, although it will be appreciated that any other suitable target threshold could be used. FIG. 11 also schematically shows a user defined target threshold offset $Thr_{Offset}$ indicated by dashed line 610. In the example shown in FIG. 11, the user defined target threshold offset $Thr_{Offset}$ corresponds to a Q-score of 73%, although it will be appreciated that any other suitable value could be used. In other words, the magnitude of the user defined target threshold offset $Thr_{Offset}$ corresponds to a Q-score of 7% (in this example, a Q-score of 7% below the target threshold).

As illustrated in FIG. 11, at a point P, the cell changes from being poorly optimised to well optimised because the Q-score (as indicated by line 600) becomes greater than the target threshold minus the user defined target threshold offset $Thr_{Offset}$.

In a region Q, the Q-score as indicated by the line 600 varies with time but remains greater than the target threshold minus the user defined target threshold offset $Thr_{Offset}$ (indicated by the line 610). Therefore, the cell is determined to be well optimised in the region Q, even though the variation in the Q-score means that the Q-score is sometimes less than the target threshold (indicated by the line 605).

However, at a point R, the Q-score becomes less than the target threshold minus the user defined target threshold offset $Thr_{Offset}$ indicating that the cell has become poorly optimised. Therefore, as mentioned above, in some examples, a alarm data may be generated indicating this transition. In examples, the transition from well optimised to poorly optimised may trigger modification of the cell, for example as described above with reference to FIGS. 4 and 5.

In some examples, the user defined target threshold offset $Thr_{Offset}$ is applied when the measured Q-score becomes greater than the target threshold. For example, referring to FIG. 11, the cell is determined to be well optimised when the measure Q-score (indicated by the line 600) becomes greater than the target threshold as indicated by a point S in FIG. 11. The user defined target threshold offset $Thr_{Offset}$ is then applied to the target threshold so that the threshold at which it is determined that the cell is poorly optimised becomes smaller. In other words, the threshold at which it is determined that the cell is poorly optimised is set to be the target threshold minus the user defined target threshold offset $Thr_{Offset}$.

In the example of FIG. 11, if the measured Q-score becomes less than the target threshold minus the user defined target threshold offset $Thr_{Offset}$ (as indicated by the dashed line 610), then the cell is determined to be poorly optimised. This allows some variation to occur in the Q-score as indicated in the region Q without a transition from "well optimised" to "poorly optimised" being flagged up. If the Q-score becomes less than the target threshold minus the user defined target threshold offset $Thr_{Offset}$, then the threshold at which the cell is determined to be well optimised is set to the target threshold (indicated by the dashed line 605 in the example of FIG. 11). Therefore, hysteresis in changing between a state of "poorly optimised" and "well optimised" may be taken into account.

Whilst the above description of the examples of FIG. 11 relate to the user defined target threshold offset $Thr_{Offset}$, it will be appreciated that similar techniques could also be used with the user defined efficiency offset $\mu_{100\%\_OFFSET}$.

In examples, the user defined target threshold offset $Thr_{Offset}$, and/or the user defined efficiency offset $\mu_{100\%\_OFFSET}$ may be applied to try to take account or regional variations between cells. For example, the user defined target threshold offset $Thr_{Offset}$, and/or the user defined efficiency offset $\mu_{100\%\_OFFSET}$ may be applied in one or more of the following circumstances:

1. if a cell has a small coverage footprint (e.g. below a cell size threshold) which may give rise to excellent radio conditions (e.g. greater than a radio conditions threshold) over a large percentage (e.g. greater than a threshold percentage) of the cell;
2. if the cell is large (e.g. greater than a cell size threshold) which may result in poorer radio conditions (e.g. less than the radio conditions threshold) over a larger percentage of the cell (e.g. greater than the threshold percentage); and
3. in situations where cell users may be located mostly at the centre of the cell (e.g. within a predetermined threshold distance of the eNodeB) or towards an edge of the cell (e.g. within a predetermined threshold distance of the edge of the cell) such that the samples used to determine the Q-score are weighted unevenly across the cell.

It will be appreciated that one or more of these conditions may be combined as appropriate and that the user defined target threshold offset $Thr_{Offset}$, and/or the user defined efficiency offset $\mu_{100\%\_OFFSET}$ may be applied as appropriate.

In some examples, the techniques described herein can be implemented as an embedded algorithm by a one or more FPGAs or ASICs, and/or appropriate softwared, at one or more eNobeBs. However, it will be appreciated that the techniques described herein can be implemented by one or more FPGAs or ASICs, and/or appropriate software at one or more femtocells in the EUTRAN. It will also be appreciated that the techniques described herein can be implemented by other suitable equipment in the EUTRAN and/or EPC.

For example, a UE device, such as UE device 110, could receive throughput data indicative of the data throughput of the protocol stack and detect resources allocated (e.g. number of allocated PRBs) to it by the network so as to calculate a Q-score as described above. Alternatively, the UE device could calculate a Q-score from the resources allocated to it by the network (e.g. number of allocated PRBs), and the throughput of a protocol stack implemented by the UE device in receiving and/or transmitting data. As further examples, the techniques described herein can be implemented as one or more of:

a process based on direct measurement reports (e.g. of data throughput and number of allocated PRBs) generated from a trace feed at the OMC;

a process off the OMC via input from an ItF-N (northbound interface of the OMC), for example of data indicative of data throughput and number of allocated PRBs;

an S1 interface (e.g. in accordance with 3GPP LTE) probe client or higher level client which receives data from the S1 interface as an MR report package extensions to the S1-AP; and a trace process off a formal minimisation of a Drive Test 3GPP interface (e.g. in accordance with 3GPP LTE) off a 3GPP trace server.

It will be appreciated that the one or more Q-scores may be generated in one or more locations, for example, those described above, and combined as appropriate so as to provide an indication of operation of the network.

In examples, one or more Q-scores may be used to indicate performance of a self organising network (SON). There are different types of self organised networks. These include distributed self organised networks and centralised self organised networks. In a distributed SON, management and optimisation of the SON may be carried out by each eNodeB implementing an optimisation algorithm, for example based on KPIs mentioned above.

In examples, a distributed SON may monitor the performance of cells and optimise performance using the Q-score techniques described herein. This can reduce processing needed to monitor the performance because performance can be assessed based on the Q-score rather than many KPIs (typically 100 or more).

In a centralised SON, assessment of cell performance and optimisation of one or more cells is carried out by the OMC, for example based on KPIs received from each eNodeB in the EUTRAN.

In examples, a centralised SON may monitor the performance of a cell and optimise performance using the Q-score techniques described herein. This can reduce processing needed to monitor the performance because performance can be assessed based on the Q-score rather than analysing many KPIs (typically 100 or more for each cell), for every cell in the network.

In other words, the use of a Q-score together with thresholds, such as those described herein can be thought of as "policing" operation in which an optimisation procedure may be carried out in dependence upon the relationship of the Q-score for that cell to a performance threshold(s) such as the target threshold mentioned above.

In some examples, an OMC of a centralised SON is operable to receive performance data including throughput data and number of allocated PRBs necessary to calculate the Q-score from one or more eNodeBs. The OMC then calculates the Q-score using techniques described herein, and if a cell is detected as not performing satisfactorily, e.g. as indicated by the performance thresholds, then the OMC can reconfigure the operation of that cell, for example by triggering capacity augmentation or cell optimisation as described above.

In some examples, a so-called "hybrid" SON may be used. In these examples, each eNodeB is operable to generate a Q-score indicative of its performance and transmit performance data to the OMC which indicates whether that cell is performing satisfactorily (e.g. poor, average, good as described above). If the performance data received at the OMC indicates that a cell is performing unsatisfactorily, e.g. if the performance data indicates a cell is performing poorly (for example, Q-score below target threshold), then the OMC can reconfigure that cell. In examples in relation to 3GPP LTE, the OMC can reconfigure a cell and/or cells by modifying a white list, grey list, X2 interfaces that are active for an automated neighbour relation (ANR) algorithm, cell boundaries and the like, although it will be appreciated that any other suitable configurable aspect of a cell and/or cells may be modified as appropriate. Furthermore, it will be appreciated that other modifications may be made depending on the type of network, for example a network according to so-called "4G", although other types of network could also be used.

As mentioned above, in some examples, the OMC is operable to generate the Q-score. In order to generate the Q-score, in some examples the OMC is operable to receive trace data from one or more UE devices. In examples, the trace data comprises information relating to the protocol stack such as information relating to communication parameters used to transmit and/or receive a particular data packet, although it will be appreciated that the trace data could comprise other suitable data. In examples, the trace data includes the throughput data of the protocol stack together with the number of allocated PRBs so that the OMC can generate a Q-score as described above. In some examples, a cellular operator may use a plurality of UE devices geographically distributed within a cell to generate trace data and each UE device is operable to transmit the trace data to the OMC so that the OMC can generate a Q-score for that cell.

In some examples, a user of a UE device can download a Q-score software application (an "app") from an app server (for example administered by the cellular operator) which causes their UE device to generate the trace data and send the trace data to the OMC so that the OMC can generate a Q-score for the cell in which the UE device is located. Additionally, in some examples, to provide an incentive for the user to download the Q-score app, the cellular operator and/or vendor may provide additional free minutes on the user's calling plan and/or additional free SMS (short message service) messages, although it will be appreciated that other incentives could be provided. Additionally, it will be appreciated that the Q-score app could be loaded onto a user UE device in any other suitable manner such as via a removable storage medium or over a network.

It will be appreciated that, whilst the above techniques have been described above with reference to the example of 3GPP LTE, the techniques described herein may be more generally applicable to other telecommunications networks such as so-called "4G", "LTE Advanced", although the techniques described herein could also apply to other networks as appropriate. Furthermore, it will be appreciated that the techniques described herein may be combined with each other as appropriate.

The various methods set out above may be implemented by adaptation of a computing system and/or telecommunications network, for example by using a computer program product comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the existing equivalent device.

In conclusion, although a variety of examples have been described herein, these are provided by way of example only, and many variations and modifications will be apparent to the skilled person and fall within the spirit and scope of the present invention, which is defined by the appended claims and their equivalents.

The invention claimed is:

1. A method for assessing performance of a cell in a network wherein data is passed between layers in a protocol stack implemented by the cell, the method comprising:
calculating, by at least one computer processor, a spectral/bandwidth efficiency of data passing through a physical layer in the protocol stack via one or more higher layers in the protocol stack based on a comparison of a number of physical resource data units allocated to that data at the physical layer with a data throughput of one or more of the layers of the protocol stack;
calculating, by the at least one computer processor, an average efficiency by averaging the spectral/bandwidth efficiency over a predetermined time,
wherein said calculating the average efficiency comprises:
generating, by the at least one computer processor, plot data so that the detected number of physical resource data units can be plotted in an x-direction on a graph and the detected data throughput can be plotted in a y-direction on the graph; and
fitting, by the at least one computer processor, a straight line through the plot data so as to determine a gradient of the line, the straight line passing through the origin of the graph,
wherein the gradient of the line is indicative of the average efficiency, and
the protocol stack has an associated transmission time interval indicative of a transmission time of data between layers in the protocol stack; and
the predetermined time over which the average efficiency is calculated is a predetermined multiple of the transmission time interval;
normalising, by the at least one computer processor, the average efficiency with respect to a predetermined efficiency so as to generate a normalised average efficiency;
comparing, by the at least one computer processor, the normalised average efficiency with a target threshold; and
adjusting, by the at least one computer processor, the operation of the cell by performing cell optimization if the normalised average efficiency differs from the target threshold by greater than a threshold amount.

2. The method according to claim 1, comprising:
detecting, by the at least one computer processor, if a degree of utilisation of the cell is greater than a cell utilisation threshold; and
initiating, by the at least one computer processor, a procedure to augment the capacity of the cell if the degree of utilisation of the cell is greater than the cell utilisation threshold and the normalised average efficiency is greater than the target threshold by the threshold amount.

3. The method according to claim 1, comprising:
initiating, by the at least one computer processor, a cell optimisation procedure if the normalised average efficiency is less than the target threshold by the threshold amount.

4. The method according to claim 1, wherein calculating the spectral/bandwidth efficiency comprises:
measuring, by the at least one computer processor, the data throughput of the one or more layers of the protocol stack.

5. The method according to claim 1, wherein the threshold amount is zero.

6. The method according to claim 1, wherein the one or more higher layers comprise at least layer 2 of the protocol stack.

7. The method according to claim 6, wherein layer 2 of the protocol stack corresponds to a radio link layer.

8. The method according to claim 1, wherein the protocol stack is a 3 GPP long term evolution protocol stack.

9. The method according to claim 8, wherein the physical resource data unit comprises a physical resource block.

10. The method according to claim 1, herein the data passes from the physical layer to the one or more higher layers.

11. The method according to claim 1, wherein the data passes from the one or more higher layers to the physical layer.

12. The method according to claim 1, wherein the efficiency has units of megabits per second per physical resource data unit.

13. The method according to claim 1, the network is a telecommunications network.

14. The method according to claim 1, wherein the predetermined efficiency is based on one or more of:
a signal to interference ratio across the cell;
terminal locations within the cell;
a hybrid automatic repeat request (HARQ) retransmission rate;
a multiple input multiple output (MIMO) configuration;
system bandwidth; or
medium access control (MAC) layer scheduler efficiency.

15. The method according to claim 1, wherein the predetermined efficiency comprises a theoretical maximum efficiency plus or minus a user defined efficiency offset.

16. The method according to claim 1, wherein a user defined target threshold offset is defined with respect to the target threshold.

17. The method according to claim 1, further comprising estimating a maximum throughput from the gradient of the line.

18. The method according to claim 1, wherein said performing cell optimization comprises at least one of:
reconfiguring, by the at least one computer processor, base station settings;
rearranging, by the at least one computer processor, equipment;
augmenting, by the at least one computer processor, capacity;
increasing, by the at least one computer processor, capacity;
modifying, by the at least one computer processor, capacity; or
decreasing, by the at least one computer processor, capacity.

19. Apparatus for assessing performance of a cell in a network wherein data is passed between layers in a protocol stack implemented by the cell, the apparatus comprising:
at least one memory; and
at least one computer processor coupled to said at least one memory, said at least one computer processor configured to:
calculate a spectral/bandwidth efficiency of data passing through a physical layer in the protocol stack via one or more higher layers in the protocol stack based on a comparison of a number of physical resource data units allocated to that data at the physical layer with a data throughput of one or more of the layers of the protocol stack;

calculate an average efficiency by averaging the spectral/bandwidth efficiency over a predetermined time,
wherein said calculate the average efficiency comprises wherein said at least one computer processor is configured to:
generate plot data so that the detected number of physical resource data units can be plotted in an x-direction on a graph and the detected data throughput can be plotted in a y-direction on the graph; and
fit a straight line through the plot data so as to determine a gradient of the line, the straight line passing through the origin of the graph,
wherein the gradient of the line is indicative of the average efficiency, and
the protocol stack has an associated transmission time interval indicative of a transmission time of data between layers in the protocol stack; and
the predetermined time over which the average efficiency is calculated is a predetermined multiple of the transmission time interval;
normalise the average efficiency with respect to a predetermined efficiency so as to generate a normalised average efficiency;
compare the normalised average efficiency with a target threshold; and
adjust the operation of the cell by performing cell optimization if the normalised average efficiency differs from the target threshold by greater than a threshold amount.

20. Apparatus for assessing performance of a cell in a network wherein data is passed between layers in a protocol stack implemented by the cell, the apparatus comprising a nontransitory computer readable medium embodied with computer program logic, which when executed on at least one electronic computer processor performs a method comprising:
calculating, by the at least one electronic computer processor, a spectral/bandwidth efficiency of data passing through a physical layer in the protocol stack via one or more higher layers in the protocol stack based on a comparison of a number of physical resource data units allocated to that data at the physical layer with a data throughput of one or more of the layers of the protocol stack;
calculating, by the at least one electronic computer processor, an average efficiency by averaging the spectral/bandwidth efficiency over a predetermined time,
wherein said calculating the average efficiency comprises:
generating, by the at least one electronic computer processor, plot data so that the detected number of physical resource data units can be plotted in an x-direction on a graph and the detected data throughput can be plotted in a y-direction on the graph; and
fitting, by the at least one electronic computer processor, a straight line through the plot data so as to determine a gradient of the line, the straight line passing through the origin of the graph,
wherein the gradient of the line is indicative of the average efficiency, and
the protocol stack has an associated transmission time interval indicative of a transmission time of data between layers in the protocol stack; and
the predetermined time over which the average efficiency is calculated is a predetermined multiple of the transmission time interval;
normalising, by the at least one electronic computer processor, the average efficiency with respect to a predetermined efficiency so as to generate a normalised average efficiency;
comparing, by the at least one electronic computer processor, the normalised average efficiency with a target threshold; and
adjusting, by the at least one electronic computer processor, the operation of the cell by performing cell optimization if the normalised average efficiency differs from the target threshold by greater than a threshold amount.

21. Apparatus for assessing performance of a cell in a network wherein data is passed between layers in a protocol stack implemented by the cell, the apparatus comprising:
a spectral/bandwidth efficiency calculator device comprising at least one of hardware, subhardware, a computing device, a subdevice, a processor, or coprocessor, circuitry, or subcircuitry operable to calculate a spectral/bandwidth efficiency of data passing through a physical layer in the protocol stack via one or more higher layers in the protocol stack based on a comparison of a number of physical resource data units allocated to that data at the physical layer with a data throughput of one or more of the layers of the protocol stack;
an average efficiency calculator device comprising at least one of hardware, subhardware, a computing device, a subdevice, a processor, or coprocessor, circuitry, or subcircuitry, said average efficiency calculator operable to calculate an average efficiency by averaging the spectral/bandwidth efficiency over a predetermined time,
wherein said average efficiency calculator device comprises:
a plot data generator so that the detected number of physical resource data units can be plotted in an x-direction on a graph and the detected data throughput can be plotted in a y-direction on the graph; and
a straight line fit through the plot data so as to determine a gradient of the line, the straight line passing through the origin of the graph,
wherein the gradient of the line is indicative of the average efficiency, and
the protocol stack has an associated transmission time interval indicative of a transmission time of data between layers in the protocol stack; and
the predetermined time over which the average efficiency is calculated is a predetermined multiple of the transmission time interval;
an average efficiency normaliser operable to normalise the average efficiency with respect to a predetermined efficiency so as to generate a normalised average efficiency;
a comparator operable to compare the normalised average efficiency with a target threshold; and
a cell adjustment module operable to adjust the operation of the cell by performing cell optimization if the normalised average efficiency differs from the target threshold by greater than a threshold amount.

22. A method for assessing performance of a cell in a 3GPP long term evolution (LTE) network wherein data is passed between layers in a 3GPP LTE protocol stack implemented by the cell, the method comprising:
calculating, by at least one computer processor, a spectral/bandwidth efficiency of data passing through a physical layer in the protocol stack via one or more higher layers in the protocol stack based on a comparison of a number of physical resource blocks allocated to that data at the physical layer with a data throughput of one or more of the layers of the protocol stack;

calculating, by the at least one computer processor, an average efficiency by averaging the spectral/bandwidth efficiency over a predetermined time, wherein said calculating the average efficiency comprises:
generating, by the at least one computer processor, plot data so that the detected number of physical resource data units can be plotted in an x-direction on a graph and the detected data throughput can be plotted in a y-direction on the graph; and fitting a straight line through the plot data so as to determine a gradient of the line, the straight line passing through the origin of the graph,
wherein the gradient of the line is indicative of the average efficiency, and the protocol stack has an associated transmission time interval indicative of a transmission time of data between layers in the protocol stack; and the predetermined time over which the average efficiency is calculated is a predetermined multiple of the transmission time interval;

normalising, by the at least one computer processor, the average efficiency with respect to a predetermined efficiency so as to generate a normalised average efficiency;

comparing, by the at least one computer processor, the normalised average efficiency with a target threshold; and adjusting, by the at least one computer processor, the operation of the cell by performing cell optimization if the normalised average efficiency differs from the target threshold by greater than a threshold amount.

23. A method for assessing performance of a cell in a network wherein data is passed between layers in a protocol stack implemented by the cell, the method comprising:

calculating, by at least one computer processor, a spectral/bandwidth efficiency of data passing through a physical layer in the protocol stack via one or more higher layers in the protocol stack based on a comparison of a number of physical resource data units allocated to that data at the physical layer with a data throughput of one or more of the layers of the protocol stack;

calculating, by the at least one computer processor, an average efficiency by averaging the spectral/bandwidth efficiency over a predetermined time, wherein said calculating the average efficiency comprises:
generating, by the at least one computer processor, plot data so that the detected number of physical resource data units can be plotted in an x-direction on a graph and the detected data throughput can be plotted in a y-direction on the graph; and fitting, by the at least one computer processor, a straight line through the plot data so as to determine a gradient of the line, the straight line passing through the origin of the graph,
wherein the gradient of the line is indicative of the average efficiency, and the protocol stack has an associated transmission time interval indicative of a transmission time of data between layers in the protocol stack; and the predetermined time over which the average efficiency is calculated is a predetermined multiple of the transmission time interval;

normalising, by the at least one computer processor, the average efficiency with respect to a predetermined efficiency so as to generate a normalised average efficiency;

comparing, by the at least one computer processor, the normalised average efficiency with a target threshold;

detecting, by the at least one computer processor, if a degree of utilisation of the cell is greater than a cell utilisation threshold if the normalised efficiency is greater than the target threshold by the efficiency threshold amount;

initiating, by the at least one computer processor, a procedure to augment the capacity of the cell if the degree of utilisation of the cell is greater than the cell utilisation threshold and the normalised average efficiency is greater than the target threshold by the efficiency threshold amount; and initiating, by the at least one computer processor, a cell optimisation procedure if the normalised average efficiency is less than the target threshold by the efficiency threshold amount.

24. A method for assessing performance of a cell in a network wherein data is passed between layers in a protocol stack implemented by the cell, the method comprising:

detecting, by at least one computer processor, a number of physical resource data units allocated to data passing through a physical layer in the protocol stack via one or more higher layers in the protocol stack;

detecting, by the at least one computer processor, a data throughput of the one or more of the layers of the protocol stack;

calculating, by the at least one computer processor, an average efficiency from the detected number of physical resource data units and the detected data throughput, wherein said calculating the average efficiency comprises:
generating, by the at least one computer processor, plot data so that the detected number of physical resource data units can be plotted in an x-direction on a graph and the detected data throughput can be plotted in a y-direction on the graph; and fitting, by the at least one computer processor, a straight line through the plot data so as to determine a gradient of the line, the straight line passing through the origin of the graph,
wherein the gradient of the line is indicative of the average efficiency, and the protocol stack has an associated transmission time interval indicative of a transmission time of data between layers in the protocol stack; and the predetermined time over which the average efficiency is calculated is a predetermined multiple of the transmission time interval;

normalising, by the at least one computer processor, the average efficiency with respect to a predetermined efficiency so as to generate a normalised average efficiency;

comparing, by the at least one computer processor, the normalised average efficiency with a target threshold; and adjusting, by the at least one computer processor, the operation of the cell by performing cell optimization if the normalised average efficiency differs from the target threshold by greater than a threshold amount.

25. The method according to claim 24, wherein the calculating the average efficiency comprises:

calculating, by the at least one computer processor, a spectral/bandwidth efficiency of the data passing through the physical layer in the protocol stack via the one or more higher layers in the protocol stack based on a comparison of the number of physical resource data units allocated to that data at the physical layer with the data throughput of one or more of the layers of the protocol stack; and calculating, by the at least one computer processor, the average efficiency by averaging the spectral/bandwidth efficiency over a predetermined time.

26. A computer accessible, nontransitory storage medium having computer logic embodied thereon, which when executed on at least one computer processor performs a method comprising:

calculating, by the at least one computer processor, a spectral/bandwidth efficiency of data passing through a physical layer in the protocol stack via one or more higher layers in the protocol stack based on a comparison of a number of physical resource data units allocated to that data at the physical layer with a data throughput of one or more of the layers of the protocol stack;

calculating, by the at least one computer processor, an average efficiency by averaging the spectral/bandwidth efficiency over a predetermined time, wherein said calculating the average efficiency comprises:
generating, by the at least one computer processor, plot data so that the detected number of physical resource data units can be plotted in an x-direction on a graph and the detected data throughput can be plotted in a y-direction on the graph; and fitting, by the at least one computer processor, a straight line through the plot data so as to determine a gradient of the line, the straight line passing through the origin of the graph,
wherein the gradient of the line is indicative of the average efficiency, and the protocol stack has an associated transmission time interval indicative of a transmission time of data between layers in the protocol stack; and the predetermined time over which the average efficiency is calculated is a predetermined multiple of the transmission time interval;

normalising, by the at least one computer processor, the average efficiency with respect to a predetermined efficiency so as to generate a normalised average efficiency;

comparing, by the at least one computer processor, the normalised average efficiency with a target threshold; and adjusting, by the at least one computer processor, the operation of the cell by performing cell optimization if the normalised average efficiency differs from the target threshold by greater than a threshold amount.

27. A computer accessible, nontransitory storage medium having computer logic embodied thereon, which when executed on at least one computer processor performs a method comprising:

detecting, by the at least one computer processor, a number of physical resource data units allocated to data passing through a physical layer in the protocol stack via one or more higher layers in the protocol stack;

detecting, by the at least one computer processor, a data throughput of the one or more of the layers of the protocol stack;

calculating, by the at least one computer processor, an average efficiency from the detected number of physical resource data units and the detected data throughput, wherein said calculating the average efficiency comprises:
generating, by the at least one computer processor, plot data so that the detected number of physical resource data units can be plotted in an x-direction on a graph and the detected data throughput can be plotted in a y-direction on the graph; and fitting, by the at least one computer processor, a straight line through the plot data so as to determine a gradient of the line, the straight line passing through the origin of the graph,
wherein the gradient of the line is indicative of the average efficiency, and the protocol stack has an associated transmission time interval indicative of a transmission time of data between layers in the protocol stack; and the predetermined time over which the average efficiency is calculated is a predetermined multiple of the transmission time interval;

normalising, by the at least one computer processor, the average efficiency with respect to a predetermined efficiency so as to generate a normalised average efficiency;

comparing, by the at least one computer processor, the normalised average efficiency with a target threshold; and adjusting, by the at least one computer processor, the operation of the cell by performing cell optimization if the normalised average efficiency differs from the target threshold by greater than a threshold amount.

* * * * *